US012473572B1

(12) United States Patent
Calderón Mayo et al.

(10) Patent No.: US 12,473,572 B1
(45) Date of Patent: Nov. 18, 2025

(54) ***GALLID ALPHAHERPESVIRUS* 3 (MDV-2), A VIRAL VECTOR AGAINST DIFFERENT AVIAN PATHOGENS: A NEW VACCINATION STRATEGY IN THE POULTRY INDUSTRY**

(71) Applicant: FARMACOLÓGICOS VETERINARIOS S.A.C., Ica (PE)

(72) Inventors: Katherine Ivette Calderón Mayo, Chincha Alta (PE); Aldo Stanlee Rojas Neyra, Chincha Alta (PE); Manolo Clemente Fernández Díaz, Chincha Alta (PE)

(73) Assignee: FARMACOLÓGICOS VETERINARIOS S.A.C., ICA (PE)

( * ) Notice: Subject to any disclaimer, the term of this patent is extended or adjusted under 35 U.S.C. 154(b) by 0 days.

(21) Appl. No.: 18/938,932

(22) Filed: Nov. 6, 2024

(30) Foreign Application Priority Data

Jun. 28, 2024 (PE) ........................ 001508-2024/DIN

(51) Int. Cl.

| | |
|---|---|
| ***C12N 9/22*** | (2006.01) |
| ***A61P 31/14*** | (2006.01) |
| ***A61P 37/04*** | (2006.01) |
| ***C07K 14/005*** | (2006.01) |
| ***C12N 15/113*** | (2010.01) |
| ***C12N 15/86*** | (2006.01) |
| *A61K 39/00* | (2006.01) |

(52) U.S. Cl.
CPC .............. *C12N 15/86* (2013.01); *A61P 37/04* (2018.01); *C07K 14/005* (2013.01); *A61K 2039/5256* (2013.01); *C12N 2710/00034* (2013.01); *C12N 2710/16343* (2013.01); *C12N 2720/10034* (2013.01); *C12N 2760/18122* (2013.01); *C12N 2760/18134* (2013.01)

(58) Field of Classification Search
CPC .......... A61P 31/14; A61P 31/16; A61P 31/20; C12N 2310/20; C12N 15/1131
See application file for complete search history.

(56) References Cited

U.S. PATENT DOCUMENTS

2020/0323978 A1 10/2020 Cook et al.

FOREIGN PATENT DOCUMENTS

| | | |
|---|---|---|
| EP 3391903 | | 2/2022 |
| ES 2719409 | | 7/2019 |
| WO | WO 2018/193110 | 10/2018 |
| WO | WO 2022/136623 | 6/2022 |

OTHER PUBLICATIONS

Kim et al., "Vaccinal efficacy of melcularly cloned Gallid alphaherpesvirus 3 strain 301B/1 against very virulent Marek's disease virus challenged", Journal of General Virology, 2020, 101(5);Abstract.*

Baron et al. "Recent advances in viral vectors in veterinary vaccinology," Current Opinion in Virology, 2018, vol. 29, pp. 1-7.

Calderon et al. "A Recombinant Turkey Herpesvirus Expressing the F Protein of Newcastle Disease Virus Genotype XII Generated by NHEJ-CRISPR/Cas9 and Cre-LoxP Systems Confers Protection against Genotype XII Challenge in Chickens, " Viruses, 2022, vol. 14, p. 793.

Chumbe et al. "Characterization and Sequencing of a Genotype XII Newcastle Disease Virus Isolated from a Peacock ( Pavo cristatus ) in Peru," Genome Announcements, 2015, vol. 3, No. 4, article e00792-15.

Hein et al. "Review of Poultry Recombinant Vector Vaccines," Avian Diseases, 2021, vol. 65, pp. 438-452.

IQBAL "Progress toward the development of polyvalent vaccination strategies against multiple viral infections in Chickens using herpesvirus of turkeys as vector," Bioengineered, 2012, vol. 3, pp. 222-226.

Jarosinski et al. "Marek's disease virus: Lytic replication, oncogenesis and control," Expert Review of Vaccines, 2006, vol. 5, pp. 761-772.

Kim et al. "Vaccinal efficacy of molecularly cloned Gallid alphaherpesvirus 3 strain 301B/1 against very virulent Marek's disease virus challenge," Journal of General Virology, 2020, vol. 101, pp. 542-552.

Petherbridge et al. "Cloning of Gallid herpesvirus 3 (Marek's disease virus serotype-2) genome as infectious bacterial artificial chromosomes for analysis of viral gene functions," Journal of Virological Methods, 2009, vol. 158, pp. 11-17.

Ran et al. "Genome engineering using the CRISPR-Cas9 system," Nature Protocols, 2013, vol. 8, pp. 2281-2308.

Romanutti et al. "Current status of virus-vectored vaccines against pathogens that affect poultry," Vaccine, 2020, vol. 38, pp. 6990-7001.

Sadigh et al. "Gallid herpesvirus 3 SB-1 strain as a recombinant viral vector for poultry vaccination," NPJ Vaccines, 2018, vol. 3, pp. 1-7.

Salsman et al. "Precision genome editing in the CRISPR era," Biochemistry and Cell Biology, Apr. 2017, vol. 95, No. 2, pp. 187-201.

Suenaga et al. "Engineering large viral DNA genomes using the CRISPR-Cas9 system," Microbiology and Immunology, Sep. 2014, vol. 58, No. 9, pp. 513-522.

* cited by examiner

*Primary Examiner* — Barry A Chestnut
(74) *Attorney, Agent, or Firm* — Sheridan Ross P.C.

(57) ABSTRACT

The present invention refers in general to the field of veterinary medicine and especially to the development of vectored vaccines using the *Gallid alphaherpesvirus* 3 (GaHV-3) or Marek's disease serotype 2 (MDV-2) vector, which contains protective antigens against different avian pathogens such as Newcastle disease virus (NDV), avian infectious laryngotracheitis virus (ILTV), infectious bursal disease virus (IBDV) or Gumboro disease virus, avian influenza virus (AIV), infectious bronchitis virus (IBV).

15 Claims, 17 Drawing Sheets

Specification includes a Sequence Listing.

EXPERIMENT NO. 1 ON SPF BIRDS

EXPERIMENT NO. 2 ON BROILERS

A)

*GALLID ALPHAHERPESVIRUS* 3 (MDV-2), A VIRAL VECTOR AGAINST DIFFERENT AVIAN PATHOGENS: A NEW VACCINATION STRATEGY IN THE POULTRY INDUSTRY

CROSS REFERENCE TO RELATED APPLICATIONS

This application claims the benefit of Peru Application No. 001508-2024/DIN filed Jun. 28, 2024, the entire contents of which are incorporated herein by reference in its entirety.

REFERENCE TO SEQUENCE LISTING

This application contains a Sequence Listing submitted as an electronic text file named "Gallid-Alphaherpesvirus-3_MDV-2_SECUENCIAS_revised.xml", having a size in bytes of 1,208 KB, and created on 18 Feb. 2025. The information contained in this electronic file is hereby incorporated by reference in its entirety pursuant to 37 CFR § 1.77(b)(5)(ii).

SUMMARY

The present invention refers in general to the field of veterinary medicine and especially to the development of vectored vaccines using the *Gallid alphaherpesvirus* 3 (GaHV-3) or Marek's disease serotype 2 (MDV-2) vector, which contains protective antigens against different avian pathogens such as Newcastle disease virus (NDV), avian infectious laryngotracheitis virus (ILTV), infectious bursal disease virus (IBDV) or Gumboro disease virus, avian influenza virus (AIV), infectious bronchitis virus (IBV).

FIELD OF INVENTION

The invention describes the obtaining of new vectorized vaccines with the insertion and expression of different genes and/or protective antigens against different viral pathogens. The present invention describes the procedure for obtaining new recombinant and/or vectorized vaccines based on the *Gallid alphaherpesvirus* 3 (GaHV-3) or Marek's disease serotype 2 (MDV-2) vector, as well as the process for selecting recombinant clones with great stability, expression and immunogenicity.

Among the genes of interest in the invention are; the fusion gene (F) of Newcastle disease virus (NDV) genotype XII, or at least one other hemagglutinin neuraminidase (HN) gene of genotype XII, I, II, and/or VII, or the glycoproteins D and I (gD-I) of avian infectious laryngotracheitis (ILTV) or at least one gene of the following genes gB, gE, and gC., the VP2 protein of Gumboro infectious disease (IBDV) or at least one gene of the following genes VP3, VP4 and VPx of IBDV, the hemagglutinin (HA) and neuraminidase (NA) gene of H5N1, H5N9, $H_xN_x$ of avian influenza (AIV), avian infectious bronchitis (IBV) at least one Spike (S) gene, S1, and S2.

DESCRIPTION OF RELATED TECHNIQUE

Marek's disease virus (MDV) or *Gallid alphaherpesvirus* 2 (GaHV-2), is the etiologic agent of Marek's disease, it is an alphaherpesvirus that affects avian species (*Gallus gallus domesticus*) where it is established as a chronic infection. Marek's disease (MD), is characterized based on its immunosuppression, neurological disorders, neoplastic disorders of $CD4^+$ cells, located around the peripheral nerve and visceral organs of the host (1).

MDV is a ubiquitous virus in the commercial poultry industry worldwide that is controlled primarily through the use of vaccines. Significant losses prior to the use of vaccines precluded the possibility of raising broilers in confinement. Currently, all North and South American hens, both laying and broilers, are vaccinated against MD disease as a mandatory condition (1).

In the last 40 years, live vaccines of different strains are used in different combinations for MD control (2-4). Of which these include; the naturally attenuated vaccine Marek serotype 1 (MDV-1) strain Rispens (CVI-988), Marek serotype 2 (MDV-2) *Gallid alphaherpesvirus* 3 (GaHV-3) including strains: SB-1, 3011B/1, and HPRS24, and the turkey herpesvirus (HVT) Meleagrid herpesvirus 1 (MeAHV-1) strain Fc126. Of which the most commonly used is the strain SB-1 and MeHV-1 strain Fc126, because in combination they present an apparent additive effect in the protection of chicks against virulent strains of MDV (5).

*Gallid alphaherpesvirus* 3 (GaHV-3) belongs to the family Herpesviridae, subfamily Alphaherpesvirinae, genus Mardivirus. According to the International Committee on Taxonomy of Viruses (ICTV), the genus Mardivirus is classified into three species: *Gallid alphaherpesvirus* 2, *Gallid alphaherpesvirus* 3 (non-oncogenic strains: SB-1, 3011B/1, and HPRS-24), and Meleagrid herpesvirus 1, and formally known as: MDV serotype 1 (MDV-1), MDV serotype 2 (MDV-2), and MDV serotype 3 (MDV-3), respectively.

Additionally, the advantages of these vaccines are successful due to their long-term protection against MD, these herpesvirus vaccine strains have been recognized as recombinant viral vectors including protection against a number of avian viral pathogens, such as: Gumboro disease (IBD), avian influenza (AI), avian infectious laryngotracheitis (ILT), Newcastle disease (ND), etc. (6-9).

Although the HVT vaccine vector provides extremely effective protection, that is, these vaccines used individually have proven to be extremely effective; however, when more than one HVT vector vaccine is used, the opposite occurs, that is, problematic results are obtained in obtaining the desired immune response against each vaccine used in combination.

There are clear recommendations not to use the HVT vector with recombinant vectors, due to the result of possible interference, generating poor efficacy against foreign inserts. Therefore, with these restrictions on the HVT vector due to its use as a multivalent vaccine, there is a need to develop other vectored vaccine platforms, which would greatly complement this interference with protection against multiple vaccine components.

Alphaherpesviruses have a double-stranded DNA genome of approximately 178 kilo base pairs (kbp), of which it contains several non-essential regions for its replication, such as 10 genes in the US (unique short) region and 23 genes in the UL (unique long) region, thus allowing them to be integrated or replaced by other genes from other pathogens. Specifically, the US7, UL40 genes and UL45-46 intergenic regions of the HVT genome, and the US2 and UL41 genes of the MDV genome, tend to be used as insertion sites. Recently, a comparative study of non-essential genes has shown that US2 is more effective at expressing heterologous genes than the US10 insertion site (6).

Promoters commonly used to obtain viral vectors based on alphaherpesviruses are those of cytomegalovirus, simian virus 40, and chicken b-actin, as well as some MDV promoters (unidirectional or bidirectional), which have been successful.

The technology for obtaining MDV and HVT recombinants involves plasmids, bacmids, and fosmids.

Although these techniques allow the insertion of protective genes against other avian pathogens, these strategies have limitations and tend to be time-consuming to obtain vaccines (10).

Clustered Regularly Interspaced Short Palindromic Repeat (CRISPR)/Cas is a new gene editing system that derives from the same immune system of bacteria, which allows them to remember and destroy phages as a defense tool against viral invasions (11).

CRISPR associated to Cas 9 (CRISPR/Cas9) type II system, consisting of a guide RNA that is guided by the *Streptococcus pyogenes* Cas9 endonuclease, and which consists of: a single guide RNA (gRNA) and trans-activating crRNA (tracrRNA), has recently been developed for eukaryotic cell editing by precisely and efficiently introducing a double break in the double-stranded deoxyribonucleic acid (DNA). These double-stranded breaks (DSBs) are subsequently repaired by nonhomologous end joining (NHEJ), which repairs the DNA causing the presence of indels in the region (e.g., insertions or deletions), or by homology directed repair (HDR), which repairs the DNA in the presence of a donor homologous to the DNA. CRISPR/Cas9 is a system that has proven to be a powerful genetic tool that is currently adapted to the editing of viruses whose genomes contain DNA such as Epstein-Barr virus, pseudorabies virus and herpes simplex virus type I. CRISPR/Cas9 technology has recently been applied to avian herpesvirus (12).

From the point of view of patent documents, WO2022/136623 is known which refers to recombinant HVT constructs (rHVT), useful as a multivalent vaccine vector for birds. The rHVT comprises 4 heterologous genes from avian pathogens: the VP2 gene of IBDV, the F gene of NDV and the gD and gI genes of ILTV. The VP2 and F genes are inserted into the US genome region of the rHVT. The gD-gI genes are inserted into the UL genome region, either between UL44 and UL45, or between UL45 and UL46 of the rHVT genome. The rHVTs proved to be genetically stable in vitro and in vivo, and expressed all inserted genes well enough to induce protective immunity in birds vaccinated against IBDV, NDV and ILTV. The integration of expression cassettes is performed using CRISPR/Cas9.

In turn, document ES2719409 teaches a composition or vaccine for use in a procedure for inducing an immunogenic or protective response in an animal against one or more avian pathogens, said composition or vaccine comprising a vector of recombinant gallinaceous herpesvirus 3 (MDV-2) SB-1 strain, said vector comprising one or more heterologous polynucleotides encoding and expressing at least one antigen of an avian pathogen, wherein the heterologous polynucleotide encodes the NDV-F Newcastle disease virus protein. The heterologous polynucleotide is an NDV-F VIId polynucleotide that is codon-optimized, the promoter is an SV40 promoter and a polyadenylation signal, wherein the heterologous polynucleotide encoding NDV-F is inserted into the region between ORF UL55 and ORF LORF5 in the unique long (UL) region of the *Gallid herpesvirus* 3 (MDV-2) SB-1 strain vector; or the heterologous polynucleotide is a codon-optimized NDV-F VIId polynucleotide, the promoter is an SV40 promoter and the polyadenylation signal is endogenous originating from the glycoprotein C (gC) gene, additionally, wherein the heterologous polynucleotide encoding NDV-F is inserted into the region encoding glycoprotein C (UL44) of the *Gallid herpesvirus* 3 (MDV-2) SB-1 strain vector. The genes encoding the antigen or polypeptide described in the invention may be those encoding the fusion protein of the Newcastle disease virus (NDV-F), the hemagglutinin neuraminidase of the Newcastle disease virus (NDV-HN), among others.

Also known is document EP3391903 which refers to a recombinant vector of *Gallid herpesvirus* 3 (GaHV3; MDV-2) comprising one or more heterologous polynucleotides encoding and expressing at least one antigen of an avian pathogen, inserted into the intergenic regions UL3/UL4 and/or UL21/UL22 of the *Gallid herpesvirus* 3 vector. Preferably, the recombinant *Gallid herpesvirus* 3 vector is a vector of the recombinant *Gallid herpesvirus* 3 strain SB-1. Preferably, the at least one antigen protects against infectious bursal disease virus (IBDV), infectious laryngotracheitis virus (ILTV), Newcastle disease virus (NDV), avian influenza virus (AIV) or avian infectious bronchitis virus (IBV). The at least one antigen may be selected from the group consisting of (a) VP2, VP3, VP4 and VPX of infectious bursal disease virus (IBDV); (b) glycoprotein B, glycoprotein I, glycoprotein D, glycoprotein E and glycoprotein C of ILTV; (c) fusion protein of Newcastle disease virus (NDV-F) and viral hemagglutinin neuraminidase (NDV-NH) of NDV (d) hemagglutinin (HA) and neuraminidase (NA) of avian influenza. The *Gallid herpesvirus* 3 vector contains an expression cassette further comprising a promoter such as cytomegalovirus (CMV) and SV40 promoter.

In turn, document US2020/0323978 describes recombinant multivalent non-pathogenic Marek's disease virus constructs that encode and express foreign antigens from three or more avian viruses and methods of using multivalent avian virus vaccines. Recombinant non-pathogenic Marek's disease virus (rMDVnp) vectors (including HVT vectors) that encode and express antigens from three or more foreign pathogens of chicken viruses are provided. The rMDVnp vector encodes one or more antigens from the laryngotracheitis virus (ILTV), one or more antigens from the infectious bursal disease virus (IBDV), and one or more antigens from the Newcastle disease virus (NDV).

Document WO2018/193110 is also known, which is directed to a recombinant *Gallid herpesvirus* 3 vector encoding heterologous avian pathogen antigens comprising one or more heterologous polynucleotides inserted into the UL3/UL4 and/or UL21/UL22 intergenic sites. Additional methods for treating an avian species for protection against one or more diseases caused by avian pathogens and a method for producing the recombinant *Gallid herpesvirus* 3 vector encoding heterologous avian pathogen antigens are provided. The recombinant viral vector may have a polynucleotide encoding a viral protein or gene product of avian influenza virus (AIV), such as an HA or NA protein or gene product of AIV and fusion protein of Newcastle disease virus (NDV-F) and viral neuraminidase hemagglutinin (NDV-NH) of NDV.

In this sense, it is clear that there is an unmet need to obtain a *Gallid alphaherpesvirus* 3 as a modified recombinant vector for the insertion of the F and HN genes of NDV, gD-I, gB of ILTV, VP2 of IBDV, HA and NA of AIV, and Spike (S), S1, S2 of IBV under the control of a promoter and a terminator, which demonstrates an early immune response by serology and complete protection in SPF hens and broilers against NDV, ILTV, IBDV, AIV, IBV and a complete reduction of viral shedding in cloacal and tracheal swabs.

DETAILED DESCRIPTION OF THE INVENTION

Figure 1:
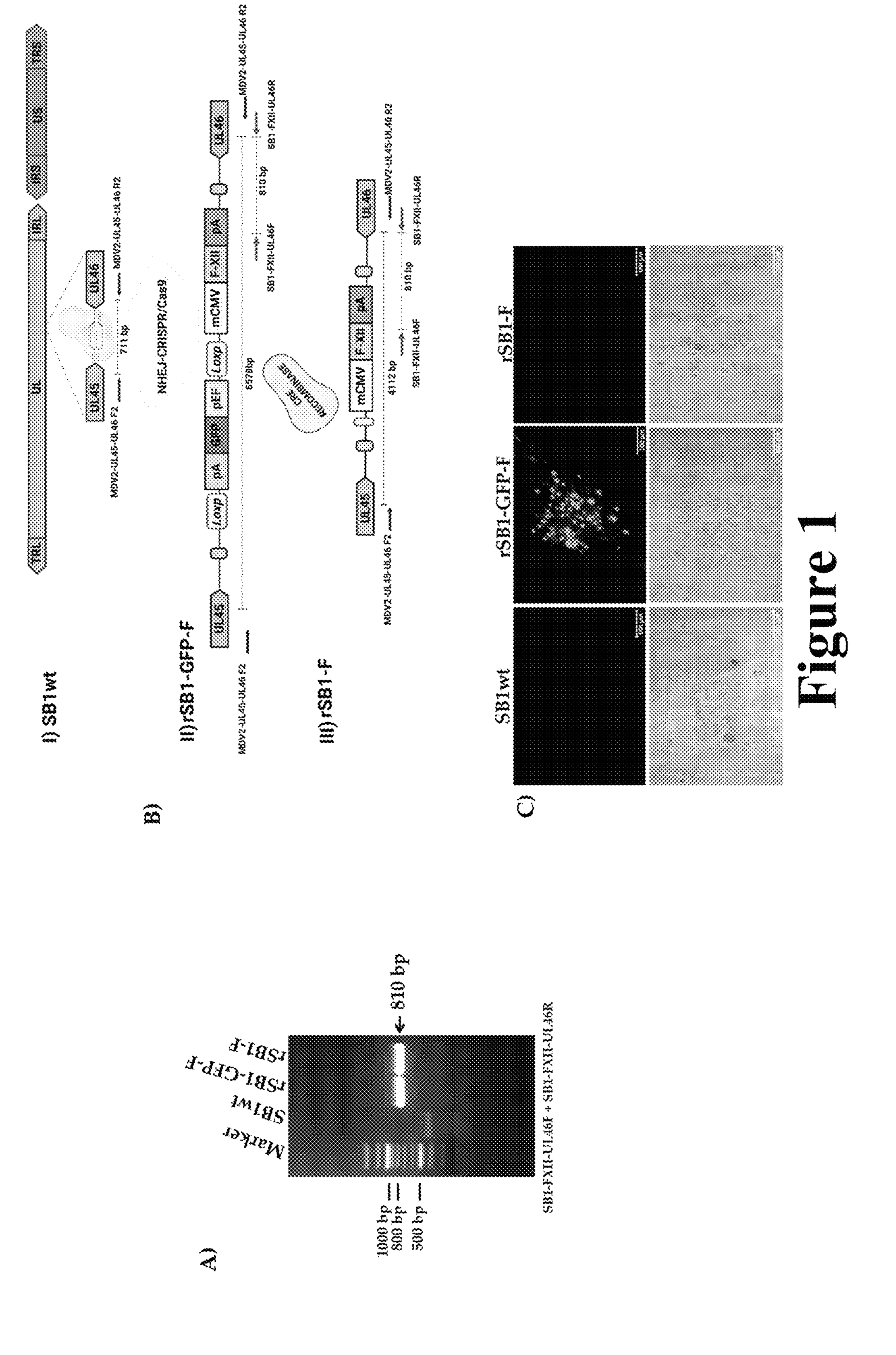
FIG. 1 shows the strategy used for the generation of the rSB1-F virus by CRISPR/Cas9-NHEJ technology. (A) Correct confirmation of insertion of the NDV genotype XII F gene into the genome of rSB1-GFP-F and rSB1-F was demonstrated using specific primers. (B) The parental virus genome, or SB1wt, is shown with a unique long (UL) region, unique short region (US), and long (TRL/IRL) and short (TRS/IRS) internal repeat regions. Strategy used for the generation of rSB1-F by CRISPR/Cas9-NHEJ. This figure was created with BioRender.com (Figure not scaled). (C) Comparison of lysis plaque morphology of SB1wt, rSB1-GFP-F, and rSB1-F in bright field and fluorescence.
Figure 2:
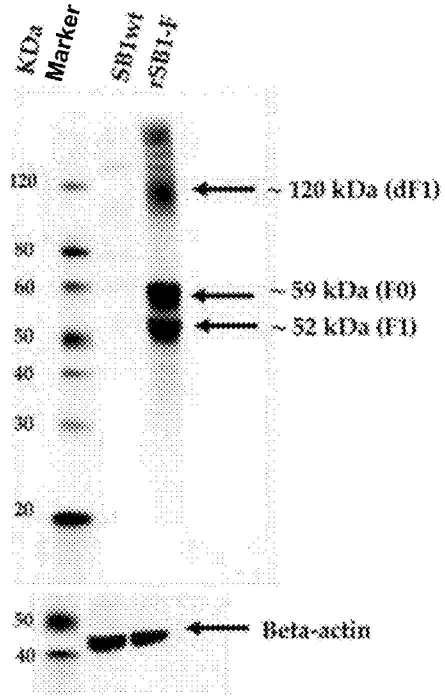
FIG. 2 shows the expression of the NDV F protein in rSB1-F at passage 20. F protein expression was assessed in CEF cells infected with rSB1-F by Western blot, where we detected a band of ~52 kDa corresponding to the subunit (F1), a band of ~59 kDa corresponding to the inactive precursor (F0) and finally a band of ~120 kDa corresponding to the F1 dimer (dF1) of the F protein. Beta-actin (β-actin) was detected as a run control and CEF cells infected with SB1wt were used as a negative control for the experiment, in which no bands were detected.

The present invention is framed within the veterinary pharmaceutical industry and relates to recombinant molecular biology methods for the development of immunogenic products for use in animals, such as birds. In particular, the present invention relates to the field of preventive veterinary medicine.

In one embodiment, the invention comprises a recombinant *Gallid alphaherpesvirus* 3 (GaHV-3, MDV-2), expressing the fusion gene (F) of Newcastle disease virus (NDV) genotype XII comprising the identification sequence SEQ. ID. NO. 4.

In a further embodiment, the invention comprises a recombinant *Gallid alphaherpesvirus* 3 (GaHV-3, MDV-2) virus expressing the fusion gene (F) of Newcastle disease virus (NDV) genotype XII wherein the fusion gene (F) insertion is inserted into the non-coding intergenic region between UL45/46 of the genome of *Gallid alphaherpesvirus* 3 (GaHV-3, MDV-2) non-oncogenic strains: SB-1 (SEQ. ID. NO. 1), 301B/1, and HPRS-24.

In a further embodiment, the invention comprises a recombinant *Gallid alphaherpesvirus* 3 (GaHV-3, MDV-2) virus, which expresses the fusion gene (F) of Newcastle disease virus (NDV) genotype XII wherein the cleavage site has been modified from polybasic ($^{112}$RRQKRF$^{117}$) to dibasic ($^{112}$GRQGRL$^{117}$).

In a further embodiment, the invention comprises a recombinant *Gallid alphaherpesvirus* 3 (GaHV-3, MDV-2) virus, which expresses the fusion gene (F) of Newcastle disease virus (NDV) genotype XII according to claim 1 wherein the synthetic sequence of the F cassette is stored in the plasmid pUC57-F In a further embodiment, the invention comprises an immunogenic composition comprising recombinant *Gallid alphaherpesvirus* 3 (GaHV3; MDV-2) virus, expressing the F gene of NDV genotype XII identified with SEQ ID NO. 5 and pharmaceutically acceptable excipients.

In a further embodiment, the invention comprises an immunogenic composition comprising the recombinant *Gallid alphaherpesvirus* 3 (GaHV3; MDV-2) virus, which expresses glycoproteins D and I of ILTV strain VFAR-043 identified with SEQ ID NO.22 and pharmaceutically acceptable excipients.

In a further embodiment, the invention comprises an immunogenic composition comprising recombinant *Gallid alphaherpesvirus* 3 (GaHV3; MDV-2) virus, expressing the VP2 gene of IBDV strain Faragher 52/70, identified with SEQ ID NO. 36 and pharmaceutically acceptable excipients.

In a further embodiment, the invention comprises a recombinant *Gallid alphaherpesvirus* 3 (GaHV3; MDV-2) virus expressing the fusion gene (F) of Newcastle disease virus (NDV) genotype XII wherein the synthetic sequence of the F cassette (genotype XII) is stored in the plasmid pUC57-F, the sequence of the F cassette and HN of NDV may vary or be obtained from other strains; Clone 30, LaSota, and B1, which may belong to genotype I, II, and VII.

In another further embodiment, the invention comprises a process for generating a recombinant virus of *Gallid alphaherpesvirus* 3 (GaHV3; MDV-2), which expresses antigenic genes against different avian diseases NDV, ILTV, IBDV, IBV and AIV, wherein the process comprises:

a) Design and construction of the gRNAs and the donor plasmid;
b) Generation of recombinants;

c) Recovery of the recombinant viruses;

e) Selection and characterization of the recombinant viruses that contain the GFP cassette+the cassette of interest (protective antigen), by conventional PCR amplifying the inserted complete cassette and the joining zones between the genome of the recombinant virus obtained and the genome of the modified virus itself;

f) Removal of the expression cassette of the fluorescent reporter gene "GFP" by the Cre-Lox system and selection of recombinant clones using conventional PCR;

g) Detection of expression of proteins of interest in cells infected with recombinant viruses by indirect immunofluorescence (IIF);

h) Determination of gene expression by Western blot (WB);

i) Evaluation of genetic stability of the cassette inserted in the virus genome by conventional PCR and/or Western blot (WB); and j) Measurement of in vitro growth properties.

In another further embodiment, the invention comprises a kit comprising a vaccine or immunogenic composition and a medium which may be a bag containing a nutrient medium named DMEM as a sterile diluent and which may be refrigerated at 4° C.

In another further embodiment, the invention comprises a vaccine comprising the recombinant *Gallid alphaherpesvirus* 3 (GaHV-3; MDV-2) virus wherein the concentration of virus required to achieve the antigenic response is 3000 plaque-forming units per bird (PFU/bird).

In another further embodiment, the invention comprises a viral vector comprising a recombinant *Gallid alphaherpesvirus* 3 (GaHV-3; MDV-2) virus according to the invention, useful in the control against Newcastle disease virus (NDV), against infectious bursal disease virus or Gumboro (IBDV), against avian infectious bronchitis virus (IBV), against avian infectious laryngotracheitis virus (ILTV) and against avian influenza virus (AIV).

In another further embodiment, the invention comprises a vaccine comprising the recombinant *Gallid alphaherpesvirus* 3 (GaHV-3; MDV-2) according to the invention, wherein the *Gallid alphaherpesvirus* 3 (GaHV3; MDV-2) is selected from non-oncogenic strains: SB-1, 301B/1, and HPRS-24.

Example 1

Construction, immunogenicity, and protective efficacy of *Gallid alphaherpesvirus* 3 (GaHV-3) efficiently expressing the Newcastle disease virus (NDV) genotype XII fusion gene in SPF birds and broilers.

I. Methodology

Animals

Specific pathogen-free (SPF) 1-day-old White Leghorn hens (Charles River Avian Vaccine Services, Norwich, USA) (Experiment No. 1) and 1-day-old broilers (Experiment No. 2).

Cells and Viruses

For the generation and maintenance of the recombinant virus rSB1-F, chick embryo fibroblast (CEF) cells harvested from 9-10-day old pathogen-free (SPF) embryonated eggs (Charles River Avian Vaccine Services, Norwich, USA) were used. CEFs cells were maintained in Dulbecco's Modified Eagle medium/F12 (DMEM, Thermo Fisher Scientific) supplemented with 5% inactivated fetal bovine serum (FBS, Thermo Fisher Scientific) and 1× antibiotic-antimycotic (Thermo Fisher Scientific), at 37° C., under 5% $CO_2$ atmosphere.

*Gallid alphaherpesvirus* 3 (GaHV3) virus or MDV-2 (MDV serotype 2) strain SB1 (GenBank accession no.: HQ840738.1) (SEQ ID NO.1) was used for the generation of recombinant rSB1-F virus in CEFs cells by CRISPR/Cas9 technology and the NHEJ repair pathway.

The NDV challenge strain known as NDV/peacock/Peru/2011 (PP2011) (GenBank accession no. KR732614) belonging to class II genotype XII with an intracerebral pathogenicity index (ICPI) of 1.80 with characteristics of a velogenic pathotype, was previously isolated and characterized in Peru.

Design and Construction

The recombinant virus rSB1-F was obtained by CRISPR/Cas9-NHEJ technology using the plasmids and sgRNAs: pGEM-sgA-GFP-F, px459v2.0-sgRNA-sgA, and px459v2.0-sgRNA1-SB1/UL45-46, px459v2.0-sgRNA2-SB1/UL45-46, px459v2.0-sgRNA3-SB1/UL45-46, px459v2.0-sgRNA4-SB1/UL45-46.

Design and Construction of sgRNAs and Donor Plasmid

Selection and Design of sgRNAs

The target sequence in this invention was the intergenic region of the UL45 and UL46 genes of the *Gallid alphaherpesvirus* 3 genome, which was submitted for gRNA design (http://crispr.mit.edu/), thus selecting 4 sequences with the highest score. The sequences are shown in Table 1.

Plasmid px459v2.0 (catalog no. 62988; Addgene, USA) was digested with BbsI-HF (Neb New England BioLabs, Inc) and then purified using the QIAquick Gel Extraction Kit (Qiagen) following the manufacturer's instructions.

sgRNAs were presented as oligo-DNA primers corresponding to the sgRNA of the target sequence were synthesized and cloned into the previously digested px459v2.0 cloning vector for the construction of px459v2.0-sgRNA. The sequence of sg-A was taken from a previous publication and cloned into the px459v2.0 plasmid in the same way. The correct insertion of the sgRNAs was confirmed by digestion with the enzyme BbsI-HF (data not shown).

Sequence of the non-coding intergenic region between UL45/46 of the *Gallid alphaherpesvirus* 3 (strain SB1) genome (SEQ ID NO.2)

```
Size: 119 bp
>acgcgagagaccgagcattagagtagcacttatttattctatcgcagag

aaacaccgcgcgcgttcaaaaaaaacacaggcggggtacgataaatttac

gcggccgcgctatgtttact
```

TABLE 1

Sequences of sgRNAs designed based on the 119 bp sequence of the UL45/46 intergenic region of the *Gallid alphaherpesvirus* 3 (strain SB1) genome (GenBank accession no.: HQ840738.1) https://www.ncbi.nlm.nih.gov/nuccore/HQ840738.1.

| # | sgRNA | 5'----------------------------3' | |
|---|---|---|---|
| 1 | gRNA1_UL45/46/SB1_T | CACCGGCGCGTTCAAAAAAAACAC | gT(+) |
| | gRNA1_UL45/46/SB1_B | AAACGTGTTTTTTTTGAACGCGCC | gB(-) |

TABLE 1-continued

| Sequences of sgRNAs designed based on the 119 bp sequence of the UL45/46 intergenic region of the *Gallid alphaherpesvirus* 3 (strain SB1) genome (GenBank accession no.: HQ840738.1) https://www.ncbi.nlm.nih.gov/nuccore/HQ840738.1. | | | |
|---|---|---|---|
| # | sgRNA | 5'----------------------------3' | |
| 2 | gRNA2_UL45/46/SB1_T | CACCGGTTCAAAAAAAACACAGGC | gT(+) |
| | gRNA2_UL45/46/SB1_B | AAACGCCTGTGTTTTTTTTGAACC | gB(−) |
| 3 | gRNA3_UL45/46/SB1_T | CACCGGGGGTACGATAAATTTACG | gT(+) |
| | gRNA3_UL45/46/SB1_B | AACCGTAAATTTATCGTACCCCC | gB(−) |
| 4 | gRNA4_UL45/46/SB1_T | CACCGTGTTTTTTTTGAACGCGCG | gT(+) |
| | gRNA4_UL45/46/SB1_B | AAACCGCGCGTTCAAAAAAAACAC | gB(−) |

B = Lower DNA chain, T= Upper DNA chain sgRNAs cloning procedure

Hybridization of sgRNAs

The sgRNA was synthesized as oligo:

5'CACCNNNNNNNNNNNNNNNNNNNNNNNNNNNNNNNNNNNNNNNNCAAA 5'

*The sgRNA was resuspended in nuclease-free water and diluted 1/10 to have a final working concentration of 10 μM.

| 1× hybridization reaction: | |
|---|---|
| Hybridization reaction | Volume |
| Hybridization buffer solution 1x | 2 μl |
| sgRNA upper DNA chain (10 μM) | 2 μl |
| sgRNA lower DNA chain (10 μM) | 2 μl |
| $H_2O$ | 14 μl |
| TOTAL | 20 μl |

*Hybridization buffer solution: 10 mM Tris, pH 7.5-8; 50 mM NaCl, 1 mM EDTA.

The samples were placed in the thermocycler under the following conditions:

90° C. for 3 min and 37° C. for 1 hour

The samples were quantified by spectrophotometry using Eppendorf BioPhotometer plus, obtaining an average value of 200 ng/μl. A 1/10 dilution was performed to have a working stock of 20 ng/μl.

Digestion or Linearization of the Plasmid Vector pX459-v2.0 (Catalog No. 62988; Addgene, USA)

| Digestion reaction 1×: | | |
|---|---|---|
| Digestion reaction | Reaction 1× | Volume |
| CutSmart Buffer Solution 10× | 1× | 2 μl |
| BbS I-HF enzyme (20 000 U) | 20 units | 1 μl |
| Plasmid (500 ng/ml) | 2 μg | 4 μl |
| $H_2O$ | | 12 μl |
| TOTAL | | 20 μl |

Samples were placed in the thermocycler at 37° C. for 6 hours.

An electrophoresis assay was performed in order to purify the band of interest, which contains the linear DNA. The gel was cut and the DNA was extracted using the QIAquick® Gel Extraction Kit 250. The linearized DNA was quantified and stored at 4° C.

Ligation of sgRNAs with the pX459-v2.0 Vector

The protocol described by NEB (Quick ligation protocol—M2200) was followed.

Ligation Reaction 1×:

| Ligation reaction | Reaction 1× | Volume (20 μl) |
|---|---|---|
| Ligase buffer solution 2× | 1× | 10 μl |
| sgRNA (20 ng/μl) | 3× (75 ng) | |
| Plasmid | 1× (25 ng) | |
| Ligase | 1× | 1 μl |
| $H_2O$ | | Up to 20 μl |
| TOTAL | | 20 μl |

The ligation products (sgRNA+vector px459-v2.0) that gave rise to the new plasmids were identified:

| Name of gRNAs cloned in px459-v2.0 |
|---|
| px459v2.0-sgRNA1-SB1/UL45-46 |
| px459v2.0-sgRNA2-SB1/UL45-46 |
| px459v2.0-sgRNA3-SB1/UL45-46 |
| px459v2.0-sgRNA4-SB1/UL45-46 |

The px459v2.0-sgRNA1-SB1/UL45-46 was selected for the following cloning steps.

Transformation into Competent *E. coli* DH5a Bacteria with the Ligation Product to Obtain the Recombinant Plasmid Px459v2.0-sgRNA1-SB1/UL45-46.

The ligation product (sgRNA+vector px459-v2.0) was added to competent *E. coli* DH5a cells, followed by heat shock from 4° to 42° C.

The transformed bacteria were grown in Luria Bertani broth (LB) supplemented with the antibiotic ampicillin (100 μg/ml), and were transferred by seeding to LB agar plates supplemented with ampicillin (100 μg/ml) for subsequent selection of clones (recombinant plasmids).

Extraction and Purification of the Recombinant Plasmid px459v2.0-sgRNA1-SB1/UL45-46

Clones (recombinant plasmids) were selected, grown in LB broths supplemented with ampicillin (100 μg/ml), the bacterial pellet was concentrated, and the plasmid was extracted using the QIAprep® Spin Miniprep Kit (250) extraction kit, according to the manufacturer's instructions, using the QIAcube equipment and the correct insertion of the sgRNA into the plasmid pX459-v2.0 was verified through the digestion product with the BbsI-HF digestion enzyme in the 1% agarose gel electrophoresis run. Finally, the UL45-46 specific sgRNA of SB1 was named px459v2.0-sgRNA1-SB1/UL45-46.

Design and Construction of the Donor Plasmid

For the construction of the donor plasmid, two consecutive cloning processes were performed: the open reading frame (ORF) of the fusion protein (F) of genotype XII strain PP2011 (NDV/peacock/Peru/2011) (GenBank accession number: KR732314) (SEQ ID NO. 3), which is flanked at both ends by the SfiI restriction site (upstream and downstream). This sequence was subsequently synthesized and cloned into plasmid pUC57 by GenScript, the resulting plasmid was named pUC57-F.

The plasmid pGEM-sgA-GFP, previously constructed. This plasmid was digested and linearized by the enzyme SfiI. The plasmid pGEM-sgA-GFP (this plasmid contains: sgA+murine cytomegalovirus promoter+Sfi cleavage sites+a SV40 Poly A signal sequence+a GFP expression cassette for the expression of the fluorescence reporter gene, the latter flanked by LoxP+sgA sequences).

The plasmid pUC57-F was digested by the enzyme SfiI to release the F cassette, then this cassette was cloned into the plasmid pGEM-sgA-GFP (linearized), the resulting plasmid was named pGEM-sgA-GFP-mCMV-F-Poly A (8886 bp).

The correct insertion and orientation of the F expression cassette was verified by PCR using specific primers and by sequencing (data not shown).

transfected for 24 hours using Lipofectamine® Reagent (Thermo Fisher Scientific) following the manufacturer's instructions.

At 24 hours post-transfection, the supernatant containing the DNA complex: Lipofectamine was removed and replaced with fresh maintenance medium, to avoid any toxicity to the cell monolayer.

At three days post transfection, infected/transfected cells were transferred and distributed into 2 6-well CEF cell culture plates previously seeded.

At four days post-transfection/infection, lysis plaques emitting GFP fluorescence were visible, corresponding to the recombinant virus. Selected clones were then purified with three rounds of plaque purification. Single cells expressing the F/GFP protein were selected and distributed into 96-well cell culture plates by fluorescence-activated cell sorting (FACS) on a BD FACSMelody™ Cell Sorter (BD Biosciences). Finally, the new recombinant virus was named rSB1-GFP-F (SEQ ID NO. 4). The presence and expression of the F cassette was then verified by conventional PCR, IIF, and Western blot.

Selection of rSB1-GFP-F Recombinant Clones

Recombinant clones of rSB1-GFP-F were evaluated by conventional PCR to confirm the correct insertion of the F/GFP cassette into the SB1 genome post-transfection and purification. Twelve clones (C1 to C12) were selected and infected into previously seeded CEF cells, then trypsinized upon reaching an infection percentage of 70%. Viral DNA was extracted and analyzed by conventional PCR using the following specific primers: MDV2-UL45-UL46 F2/MDV2-UL45-UL46 R2 (Data not shown).

TABLE 2

List of primers and sgRNAs used in this invention study

| SB1 (MDV-2) primers and sgRNAs | Address | Sequences (5'-> 3') | SEQ No. |
|---|---|---|---|
| 1F | Forward primer | CGTTGTAAAACGACGGCCAG | SEQ ID NO. 6 |
| 1R | Reverse primer | TGGCTTGGGAACAATACCCT | SEQ ID NO. 7 |
| 2F | Forward primer | ATTGAGTCACCACCCCTATGC | SEQ ID NO. 8 |
| 2R | Reverse primer | CCCAACTTCTCGGGGACTGT | SEQ ID NO. 9 |
| MDV2-UL45-UL46 F2 | Forward primer | GCAACGCTACCGAGCTAGAA | SEQ ID NO. 10 |
| MDV2-UL45-UL46 R2 | Reverse primer | AACCCTCCCTGCCACTTTTT | SEQ ID NO. 11 |
| SB1_FXII_UL46F | Forward primer | AGTCATCGTGACAGGCAACC | SEQ ID NO. 12 |
| SB1_FXII_UL46R | Reverse primer | CTACGACGGGATTGGCGATT | SEQ ID NO. 13 |
| gRNA1_UL45/46/SB1_T | Upper chain | CACCGGCGCGTTCAAAAAAAACAC | SEQ ID NO. 14 |
| gRNA1_UL45/46/SB1_B | Lower chain | AAACGTGTTTTTTTTGAACGCGCC | SEQ ID NO. 15 |

Generation of the Recombinant rSB1-GFP-F $0.5\times10^6$ CEF cells were seeded per well in a 6-well cell culture plate in maintenance medium (DMEM 1×+5% FBS) at 37° C. under 5% $CO_2$ atmosphere. After 24 hours, the supernatant was removed and the monolayer was washed 3 consecutive times with DPBS 1× to remove cellular debris. Cells were infected with SB1wt at a multiplicity of infection (MOI) of 0.001 for 8 hours at 37° C. and 5% $CO_2$ in medium DMEM 1×+5% FBS.

The next day, 1 μg of plasmid pGEM-sgA-GFP-mCMV-F-Poly A containing the mCMV-F-polyA cassette, 0.5 μg of sgRNA-sgA, and 0.5 μg sgRNA SB1 UL45-46, were co- Removal of the GFP Reporter Cassette by the Cre-Lox System The GFP expression cassette (flanked by LoxP sequences) from rSB1-GFP-F was removed by the Cre-Lox system. A monolayer of CEF cells was prepared in a 6-well cell culture plate and then infected with rSB1-GFP-F virus with MOI of 0.01 for 24 hours. The infected monolayer was then co-transfected with 2 μg of Cre-recombinase using Lipofectamine® Reagent (Thermo Fisher Scientific) following the manufacturer's instructions.

After 12 hours post-transfection the culture medium was changed to avoid any cytotoxic effect. Verification of the complete removal of the GFP reporter gene expression cassette was confirmed by the appearance of new non-fluorescent lysis plaques. Finally, the new recombinant virus obtained was named rSB1-F (SEQ ID NO.5).

Selection of Recombinant rSB1-F Clones after Removal of the GFP Reporter Cassette Verification of the complete removal of the GFP reporter cassette in the rSB1-GFP-F clones was carried out by conventional PCR using specific primers: MDV2-UL45-UL46 F2/MDV2-UL45-UL46 R2. Likewise, these same primers allowed the integrity of the F cassette in SB1 to be assessed.

Indirect Immunofluorescence Assay (IIF) Detection of F Protein Expression

CEF cells were grown in 12-well cell culture plates and then infected with MOI of 0.001 with SB1wt and rSB1-F. After 48 hours post-infection (hpi), cells were washed three times with DPBS 1× and then fixed with 4% paraformaldehyde for 30 min at room temperature. Cells were incubated with the primary antibody in a solution of 5% bovine serum albumin (BSA) in DPBS for 1 h at room temperature. A chicken anti-MDV antibody (Charles River Avian Vaccine Services, Norwich, USA) was used as a positive control for the detection of SB1 infection, and the rabbit primary antibody against NDV F (GenScript, Piscataway, NJ, USA) was used for the detection of F protein expression. After three washes with DPBS 1×, cells were incubated with Alexa Fluor®405 goat anti-chicken IgY antibody (Abcam, Cambridge, MA, USA) (blue fluorescence) and Alexa Fluor®594 goat anti-rabbit IgG H&L antibody (Abcam, Cambridge, MA, USA) (red fluorescence), respectively, in DPBS 1× with 5% BSA for 45 min at room temperature. The results were observed using an ObserverA1 fluorescence microscope (Carl Zeiss, Germany). Digital images were taken at 50× magnification and processed with the AxioCam MRc5 camera (Carl Zeiss, Germany).

Western Blot

To evaluate the expression of NDV F protein, CEF cells were infected with the recombinant virus with MOI of 0.01. At 72 hpi, CEF cells were lysed and analyzed by Western blot. Western blot analysis was performed using a specific primary antibody against NDV F (GenScript) diluted 10/5000 in 1% milk in 0.1% PBS-T for 15 hours at room temperature with constant agitation. Subsequently, three washes were performed with 0.1% T-TBS (each wash for 10 min with constant agitation). After finishing the washes, the membrane was incubated with the monoclonal anti-Rabbit IgG HRP secondary antibody (Catalog No. A01827, GenScript, Piscataway, NJ, USA) diluted 1/5000 in 1% milk in 0.1% PBS-T for 2 hours at room temperature with constant agitation.

Visualizations of protein expression were detected using a photodocumenter and an AZURE CCD camera (Azure Biosystems, Inc., Dublin, USA).

In Vitro Genetic Stability of rSB1-F

Genetic stability was assessed in CEFs up to passage 20. Viral DNA was extracted from infected CEF cells, and the presence of the F cassette and insert was verified every 5 passages, which was confirmed by conventional PCR using specific primers MDV2-UL45-UL46 F2/MDV2-UL45-UL46 R2. F protein expression was assessed every 5 passages by Western blot assay, as previously described in the Western blot section.

Experimental Design No. 1:

Immunization of SPF Birds with the rSB1-F Vaccine

Twenty 1-day-old SPF chicks were randomly divided into two groups: Group No. 1=rSB1-F (n=10) that was immunized with 3000 plaque-forming units (PFU) of rSB1-F vaccine per bird subcutaneously and Group No. 2=non-immunized control (n=10). At 34, 46, and 55 days post-immunization, serum samples were collected to evaluate the humoral immune response by detecting specific antibodies against the NDV Fusion protein, using an ELISA Kit from ID Screen Newcastle Disease Indirect (ID. Vet)—NDVS.

To evaluate the protective efficacy of rSB1-F, immunized and non-immunized birds were partially transferred to the biosafety level 3 (BSL-3) facilities of FARVET S.A.C. Birds were challenged at 59 days post-immunization with $10^4$ $TCID_{50}$ of NDV genotype XII strain PP2011 with 0.1 ml (0.05 ml per ocular cavity and 0.05 ml per nasal cavity). Observations were made for a period of 14 days post-challenge (d.p.d) to evaluate clinical signs; which were recorded and reported daily. To determine viral shedding, oral and cloacal swab samples were collected (3, 5, and 7 d.p.d) from immunized and non-immunized birds, respectively. Following collection, swabs were immediately soaked in 1 ml of PBS 1× supplemented with antibiotic-antimycotic (final concentration of 10×) for a 30-minute (min) resting time at 4° C. Each swab was then removed and the supernatant was clarified to remove cellular debris and/or food/fecal residue by centrifugation at 3000 rpm for 15 min at 4° C. Samples were quantified by plaque assay.

Experimental Design No. 2:

Immunization of Broilers with the rSB1-F Vaccine

Twenty 1-day-old broilers were randomly divided into two groups: Group No. 1=rSB1-F (n=10) that was immunized with 3000 PFU of rSB1-F per bird subcutaneously and Group No. 2=non-immunized control (n=10). At 20, 34, and 41 days post-immunization, serum samples were collected to evaluate the humoral immune response by detecting specific antibodies against the NDV F protein, using an ELISA Kit from ID Screen Newcastle Disease Indirect (ID. Vet)—NDVS.

To evaluate the protective efficacy of rSB1-F, immunized and non-immunized birds were partially transferred to the BSL-3 facilities of FARVET S.A.C. Birds were challenged at 44 days post-immunization with $10^4$ $TCID_{50}$ of NDV genotype XII strain PP2011 with 0.1 ml (0.05 ml per ocular cavity and 0.05 ml per nasal cavity). Observations were made for a period of 14 d.p.d. to evaluate clinical signs; which were noted and reported daily.

To determine viral dissemination, oral and cloacal swab samples were collected (3, 5, and 7 d.p.d) from immunized and non-immunized birds, respectively. Following collection, the swabs were immediately soaked in 1 ml of PBS 1× supplemented with antibiotic-antimycotic (final concentration of 10×) for a 30 min resting time at 4° C. Then each swab was removed and the supernatant was clarified to remove cellular debris and/or food/feces debris by centrifugation at 3000 rpm for 15 min at 4° C. Samples were quantified by plate assay.

Statistical Analysis

All statistical analysis was performed using GraphPad Prism version 8.01 (GraphPad Software, San Diego, CA). Two-way Anova test was used to compare data between different groups. Differences were considered with p value $<0.0001$. Elisa titers were analyzed using Turkey's multiple comparison test at 95%.

1. Results:

Construction and Recovery of Recombinant Virus rSB1-F

The sgRNAs (sgRNA-sgA and sgRNA-UL45-46) were designed, synthesized, and cloned into plasmid px459v.20, which contains the *S. pyogenes* Cas9 gene. The resulting plasmids were named px459v2.0-sgRNA-sgA and px459v2.0-sgRNA-UL45-46.

The donor plasmid pGEM-sgA-GFP-F contains the GFP reporter expression cassette which is flanked by two LoxP sequences for its separation from the F expression cassette. The two cassettes were flanked by sg-A sites to introduce a desired cleavage for the release of the cassette and integration into the UL45-46 intergenic region of the SB1wt genome. The Cas9 endonuclease promotes the insertion of the GFP and NDV cassette into the UL45-46 intergenic region of the SB1wt genome, see FIG. 1.

For generation of rSB1-GFP-F virus, CEF cells were co-transfected with plasmids pGEM-sgA-GFP-F, px459v2.0-sgRNA-sgA, and px459v2.0-sgRNA-UL45-46. At 24 h post-transfection, cells were infected with SB1wt virus with MOI of 0.01. Plaques expressing GFP were visible at 3 days post-transfection/infection, demonstrating successful cassette insertion. Recombinant virus was isolated in three rounds of purification by lysis plaque isolation and Cell Sorter.

Figure 4:
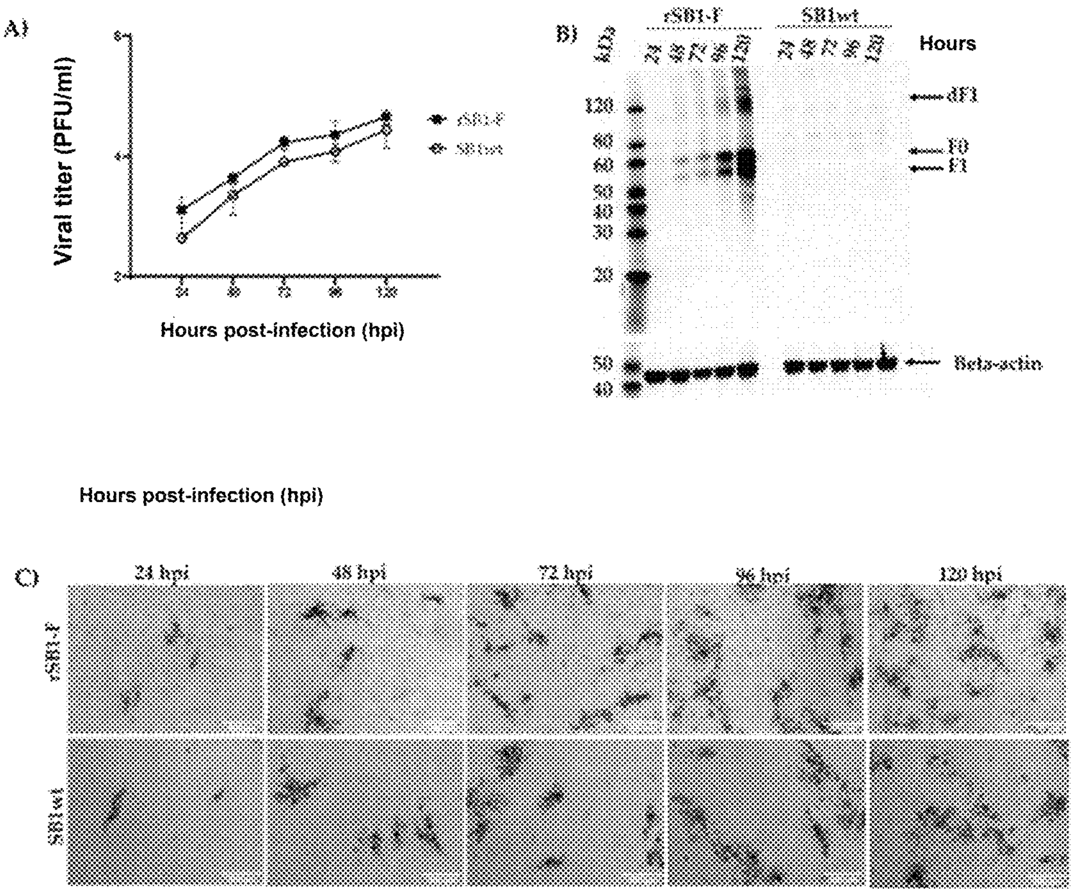
FIG. 4 shows the biological characterization of the rSB1-F virus. (A) Replication kinetics of rSB1-F and SB1wt in CEF cells, infected with MOI 0.001, harvested every 24 hours (24 to 120 hours post-infection), titers were expressed in plaque-forming units (PFU/ml). (B) Kinetics of expression of NDV F protein in CEFs cells infected with rSB1-F. Cells were infected with MOI of 0.001 of rSB1-F and SB1wt, every 24 hours the cell lysates were collected and analyzed by Western blot, detecting a band of ~52 kDa (F1), a band of ~59 kDa (F0) and finally a band of ~120 kDa (dF1) of the F protein, beta-actin (β-actin) was detected as a run control and as a negative control of the experiment, CEF cells infected with SB1wt were used, in which no band was detected. (C) Infection process and lysis plaque formation of rSB1-F and SB1wt in CEF cells. Cells were infected with MOI of 0.001, every 24 hours post-infection, cells were fixed with 4% paraformaldehyde, finally images were captured using an inverted phase contrast microscope.

Subsequently, removal of the GFP reporter cassette was performed with Cre-recombinase (pcDNA3.1-Cre) treatment through the Cre-LoxP system. Cells infected with the rHVT-GFP-F virus were co-transfected with Cre-recombinase; lysis plaques without fluorescence emission were visible 4 days post-transfection/infection. Complete removal was confirmed by conventional PCR using specific primers MDV2-UL45-UL46 F2 and MDV2-UL45-UL46 R2 (FIG. 4C). Finally, the new recombinant virus was named rSB1-F.

Selection of Clones after Removal of GFP Reporter Cassette

After removal of the GFP reporter cassette, five recombinant clones rSB1-F were selected, from which the complete removal of the GFP reporter cassette was verified by conventional PCR using specific primers: MDV2-UL45-UL46 F2/MDV2-UL45-UL46 R2. Clones C1 to C5 presented the expected size of 4112 bp, demonstrating the complete removal of the reporter cassette and integrity of the NDV F cassette, in the UL45-46 intergenic region of the *Gallid alphaherpesvirus* 3 (SB1) genome. Clone C1 was selected for the following evaluations as a characterization of the recombinant virus.

Stability of the F Gene in the Genome of the Recombinant Virus rSB1-F

Figure 3:
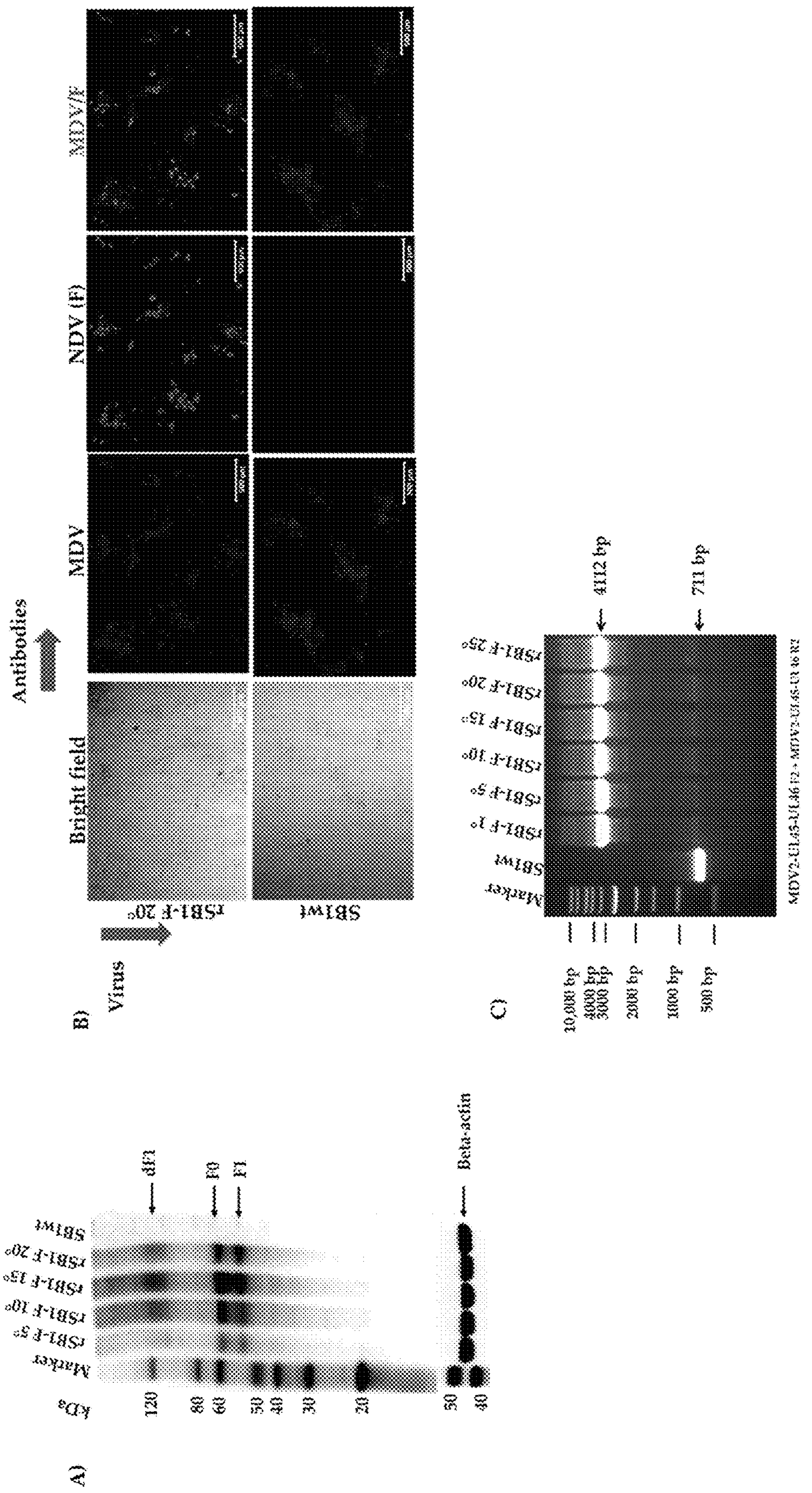
FIG. 3 shows the in vitro assessment of the stability of the F gene in the *Gallid alphaherpesvirus* 3 (SB1 strain) rSB1-F genome. CEF cells were infected with rSB1-F virus for 25 passages. (A) F protein expression was assessed in rSB1-F-infected CEF cells by Western blot every 5 passages (passage 5 to 20), where we detected a band of ~52 kDa corresponding to the subunit (F1), a band of ~59 kDa corresponding to the inactive precursor (F0), and finally a band of ~120 kDa corresponding to the F1 dimer (dF1) of the F protein. As a negative control we used CEF cells infected with SB1wt, in which no band was detected. (B) Indirect immunofluorescence assay (IIF) demonstrated expression of the F protein (red fluorescence) in cells infected with the recombinant virus rSB1-F at passage 20 in CEFs. In addition, expression of MDV-2 proteins (blue fluorescence) was detected, as well as expression of both proteins (blue/red fluorescence). CEF cells infected with SB1wt were used as a negative control. (C) Every 5 passages the presence of the F gene in the rSB1-F genome was evaluated by conventional PCR, SB1wt.

CEFs cells were infected with the rSB1-F virus for 20 passages to determine the genetic stability of the virus by indirect immunofluorescence (IIF), polymerase chain reaction (PCR) and Western blotting. Viral DNA was analyzed every 5 passages by conventional PCR where we detected the presence of the F gene with a band of ~4112 bp (FIG. 3C). Similarly, every 5 passages (passage 5 to 20) we confirmed the expression of the F protein by Western blotting (FIG. 3A) where we detected three bands: a band of ~52 kDa corresponding to the subunit (F1), a band of ~59 kDa corresponding to the inactive precursor (F0), and finally a band of ~120 kDa corresponding to the F1 dimer (dF1) of the F protein. IIF demonstrated the expression of the F protein in cells infected with the recombinant virus at passage 20 in CEFs (FIG. 3B). These results demonstrated that the presence and expression of the NDV F protein gene did not affect the replication of the recombinant virus, confirming the stability of the F gene in the viral genome of the recombinant.

Humoral Response

Figure 5:
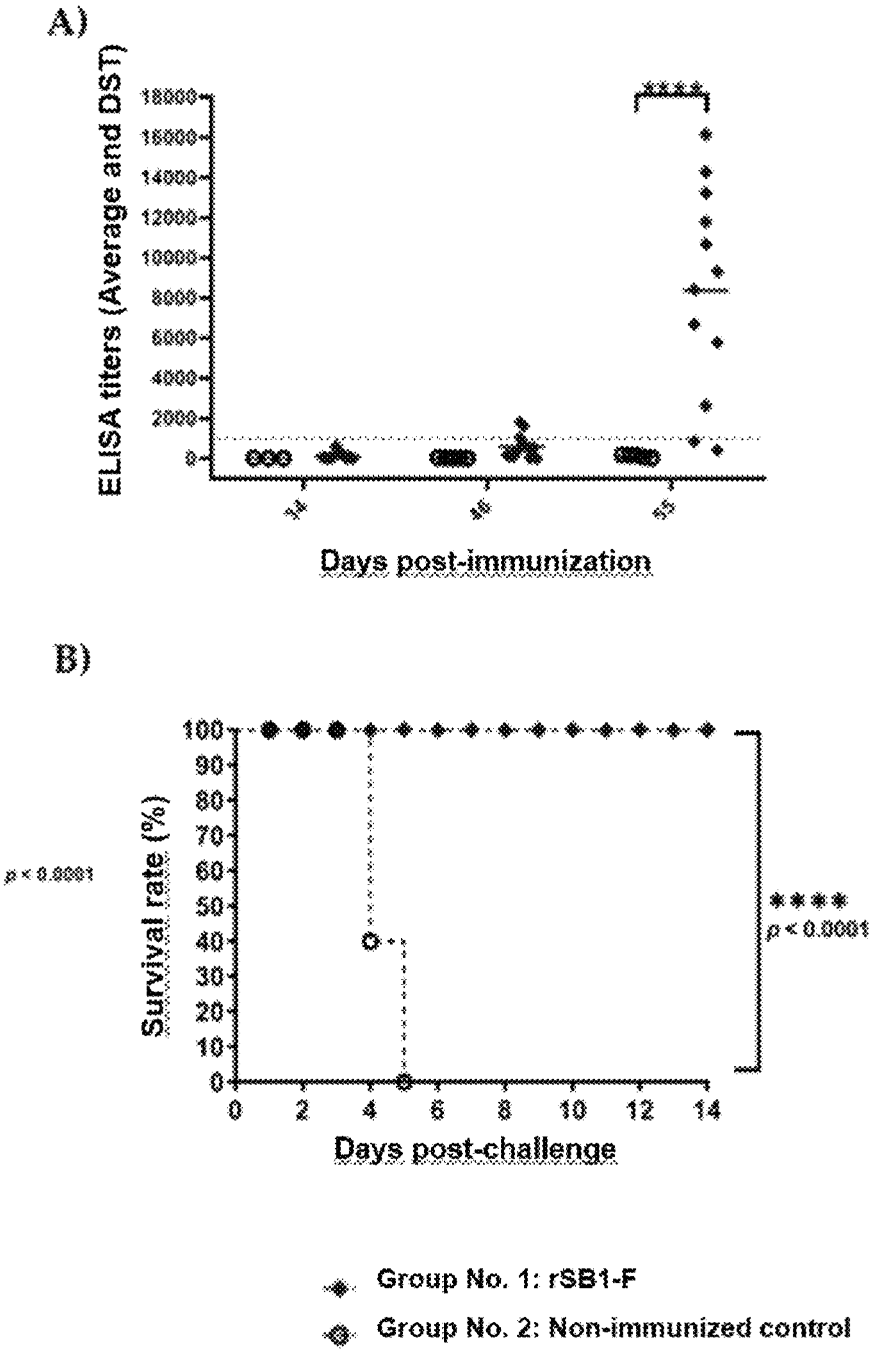
FIG. 5 shows the results of the evaluation of the humoral immune response using an ID Screen Newcastle Disease Indirect (ID. Vet)—NDVS ELISA Kit assay of experiment No. 1 in SPF birds. (A) Antibodies were monitored in serum samples at 34, 46, 55 days post-immunization, using an ELISA kit specific for the NDV F protein. The mean titers and standard deviation are represented by a horizontal bar and whiskers. Positive samples were considered above the cut-off limit (Cut off: 993 titer). (B) Survival percentage of experiment No. 1 (Groups: No. 1 and No. 2), were evaluated up to 14 days post-challenge.

A specific immune response against NDV was detected in group No. 1 rSB1-F (Experiment No. 1) at 46 days post-immunization (585.33±175.22), with 100% of these being positive at 55 days post-immunization (10/10) (8342.9±1506.28). On the other hand, in group No. 2 non-immunized control (Experiment No. 1) no immune response was detected at 46 (21.40±6.32) and 55 days post-immunization (116.200±30.44) being the Cut-off of kit 993, this last monitoring being significant with the non-immunized control group $p<0.0001$ **, see FIG. 5**A.

Figure 6:
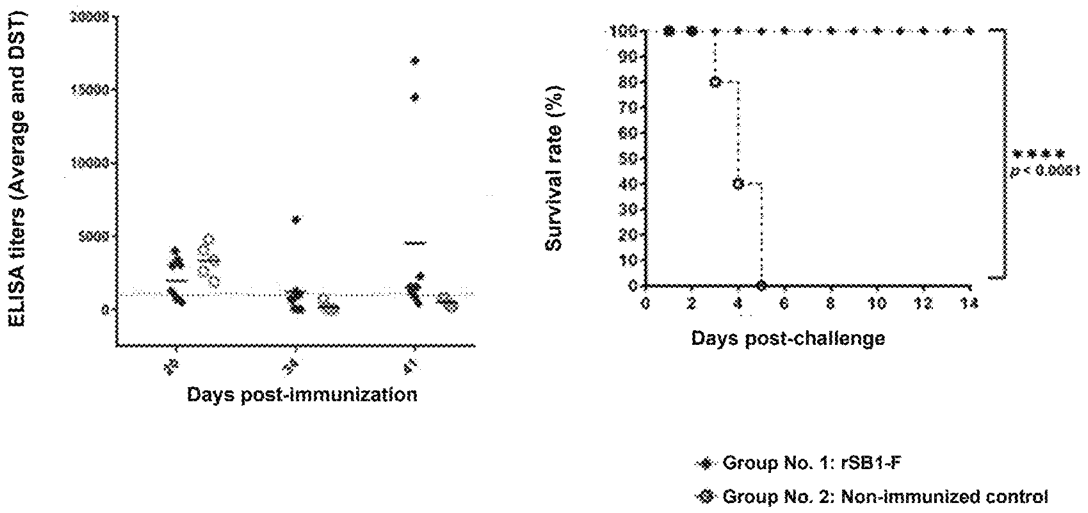
FIG. 6 shows the results of the evaluation of the humoral immune response by an ELISA Kit assay of ID Screen Newcastle Disease Indirect (ID. Vet)—NDVS of experiment No. 2 in broilers. (A) Antibodies were monitored in serum samples at 20, 34, 41 days post-immunization, using an ELISA kit specific for the NDV F protein. The mean titers and standard deviation are represented by a horizontal bar and whiskers. Positive samples were considered above the cut-off limit (Cut off: 993 titer). (B) Survival percentage of experiment No. 2 (Groups: No. 1 and No. 2), were evaluated up to 14 days post-challenge.

To determine if the rSB1-F vaccine was able to overcome the maternal antibodies as the HVT recombinant vector, a second experiment was performed in broilers (experiment No. 2). Chicks immunized at 1 day of age were monitored at 21 days post immunization detecting high titers of antibodies (1959.00±1366.98) being the cut-off of kit 993, which were interpreted as maternal antibody titers because only 9 chicks out of 10 (9/10) were positive. Then at 34 days post immunization 2/10 were positive (1190.22±1909.31) being the cut-off of kit 993. And finally at 41 days post immunization 8/10 were positive (4521.55±6401.52) being the cut-off of kit 993, see FIG. 6A.

Efficacy Against NDV Genotype XII Challenge

Protective efficacy in experiments 1 and 2 was demonstrated by the absence of clinical signs and mortality during the 14 days post-challenge (d.p.d). One-day-old birds were immunized with a single full dose of rSB1-F vaccine (in 0.2 ml diluent/dose) subcutaneously in the back of the neck, then challenged at 59- and 44-days post-immunization respectively with NDV genotype XII by the oculonasal route.

All immunized chicks (Experiment No. 1 and 2) showed complete protection, resulting in 100% viability and protection (10/10). In contrast, non-immunized control chicks (Experiment No. 1 and 2) showed typical clinical signs of the disease between 3 and 4 d.p.d., accumulating a total mortality of 100% (10/10) at 5 d.p.d. (Table 5) see FIGS. 5B and 6B.

Viral shedding of NDV genotype XII challenge virus in birds (Experiment No. 1 and 2) was quantified from tracheal and cloacal swab samples collected by plaque assay (3, 5, and 7 d.p.d). A significant reduction effect on viral shedding titers was shown in respiratory tract samples (tracheal swab samples) from vaccinated birds compared to the non-vaccinated control group after challenge. On the other hand, surprisingly viral shedding in the intestinal tract was completely reduced i.e., viral replication of NDV genotype XII was neutralized in SPF birds and broilers. On the contrary, it was observed that in the non-immunized control groups of both experiments No. 1 and 2, they presented a significant high viral shedding compared to the immunized groups, see Table 3 and 4.

TABLE 3

Frequency of tracheal and cloacal viral dissemination of the NDV genotype XII challenge virus, in SPF birds immunized with rSB1-F experiment No. 1

| | 59 days post-immunization | | | | | |
|---|---|---|---|---|---|---|
| | 3 d.p.d.[(a)] | | 5 d.p.d. | | 7 d.p.d. | |
| Groups | Tracheal | Cloacal | Tracheal | Cloacal | Tracheal | Cloacal |
| Group No. 1 = rSB1-F | 2/7 | 0/7 | 1/7 | 0/7 | 0/7 | 0/7 |
| Group No. 2 = Non-immunized control | 7/7 | 6/7 | 4/4 | 4/4 | NS[(b)] | NS |

TABLE 4

Frequency of tracheal and cloacal viral shedding of the NDV challenge virus in birds immunized (broilers) with rSB1-F experiment No. 2

| | 44 days post-immunization | | | | | |
|---|---|---|---|---|---|---|
| | 3 d.p.d.[(a)] | | 5 d.p.d. | | 7 d.p.d. | |
| Groups | Tracheal | Cloacal | Tracheal | Cloacal | Tracheal | Cloacal |
| Group No. 1 = rSB1-F | 1/7 | 0/7 | 0/7 | 0/7 | 0/7 | 0/7 |
| Group No. 2 = Non-immunized control | 7/7 | 7/7 | 4/4 | 4/4 | NS[(b)] | NS |

[(a)]d.p.d = days post-challenge
[(b)]NS = non-survivors

TABLE 5

Percentage of viability and mortality post-challenge of birds challenged with NDV genotype XII at 59- and 44-days post-immunization with rSB1-F(XII) in experiment No. 1 SPF chicks and No. 2 (broilers).

| Experiments | Groups | | | Days post-challenge (d.p.d.) 1 | 2 | 3 | 4 | 5 | 6 | 7 |
|---|---|---|---|---|---|---|---|---|---|---|
| Experiment No. 1: Challenge at 59 days post-immunization | Group No. 1 = rSB1-F (n = 10) | Experiment No. 1: Challenge at 59 days post-immunization | Dead birds | 0 | 0 | 0 | 0 | 0 | 0 | 0 |
| | | | % viability | 100% | 100% | 100% | 100% | 100% | 100% | 100% |
| | | | % mortality | 0% | 0% | 0% | 0% | 0% | 0% | 0% |
| | Group No. 2 = Non-immunized control (n = 0) | | Dead birds | 0 | 0 | 5 | 5 | NS | NS | NS |
| | | | % viability | 100% | 100% | 50% | 0% | 0% | 0% | 0% |
| | | | % mortality | 0% | 0% | 50% | 100% | NS | NS | NS |
| Experiment No. 2: Challenge at 44 days post-immunized | Group No. 1 = rSB1-F (n = 10) | Experiment No. 2: Challenge at 44 days post-immunization | Dead birds | 0 | 0 | 0 | 0 | 0 | 0 | 0 |
| | | | % viability | 100% | 100% | 100% | 100% | 100% | 100% | 100% |
| | | | % mortality | 0% | 0% | 0% | 0% | 0% | 0% | 0% |
| | Group No. 2 = Non-control (n = 10) | Experiment No. 2: Challenge at 44 days post-immunization | Dead birds | 0 | 0 | 3 | 5 | 2 | NS | NS |
| | | | % viability | 100% | 100% | 70% | 20% | 0% | NS | NS |
| | | | % mortality | 0% | 0% | 30% | 80% | 100% | NS | NS |

NS: No survivor.

Sequence Listing:

SEQ ID NO.1 Nucleotide sequence of the *Gallid alphaherpesvirus* 3 (GaHV-3) strain SB-1 genome, with GenBank accession number: HQ840738.1
Length: 165,994 base pairs (bp).

SEQ ID NO.2 Nucleotide sequence of the non-coding intergenic region between UL45/46 of the *Gallid alphaherpesvirus* 3 (GaHV-3) strain SB-1 genome, with GenBank accession number: HQ840738.1
Length: 119 bp.

SEQ ID NO.3 Nucleotide sequence of the F gene of NDV strain genotypes NDV/peacock/Peru/2011 XII, with GenBank accession number: KR732614; CDS: 4550-6211 bp.
Length: 1662 bp.

SEQ ID NO.4 Nucleotide sequence of the complete genome of the rSB1-GFP-F virus Length: 171,856 bp.

SEQ ID NO.5 Nucleotide sequence of the complete genome of the rSB1-F virus
Length: 169,390 bp.

SEQ ID NO.6 Nucleotide sequence of the primer or forward primer 1F in the 5' to 3' direction
Length: 20 bp.

SEQ ID NO.7 Nucleotide sequence of the primer or reverse primer 1R in the 5' to 3' direction
Length: 20 bp.

SEQ ID NO.8 Nucleotide sequence of the primer or forward primer 2F in the 5' to 3' direction
Length: 20 bp.

SEQ ID NO.9 Nucleotide sequence of the primer or reverse primer 2R in the 5' to 3' direction
Length: 20 bp.

SEQ ID NO.10 Nucleotide sequence of the primer or forward primer MDV2-UL45-UL46 F2 in the 5' to 3' direction
Length: 20 bp.

SEQ ID NO.11 Nucleotide sequence of the primer or reverse primer MDV2-UL45-UL46 R2 in the 5' to 3' direction
Length: 20 bp.

SEQ ID NO.12 Nucleotide sequence of the primer or forward primer SB1_FXII_UL46F in the 5' to 3' direction
Length: 20 bp.

SEQ ID NO.13 Nucleotide sequence of the primer or reverse primer SB1_FXII_UL46R in the 5' to 3' direction
Length: 20 bp.

SEQ ID NO.14 Nucleotide sequence of the upper chain oligo gRNA1_UL45/46/SB1_T
Length: 24 bp.

SEQ ID NO.15 Nucleotide sequence of the lower chain oligo gRNA1_UL45/46/SB1_B
Length: 24 bp.

Example 2

Construction, immunogenicity and protective efficacy of *Gallid alphaherpesvirus* 3 (GaHV3) that efficiently expresses glycoproteins D-I (gD-I) of avian infectious laryngotracheitis virus (ILTV) in broilers II. Methodology Animals One-day-old broilers (Experiment No. 1) were used to evaluate the immunogenicity and efficacy of the rSB1-ILTV (gD-I) vaccine against avian infectious laryngotracheitis virus (ILTV).

Cells and Viruses

For the generation and maintenance of the recombinant virus rSB1-ILTV (gD-I), CEF cells harvested from 9-10-day old SPF embryonated eggs (Charles River Avian Vaccine Services, Norwich, USA) were used. CEFs were maintained in DMEM/F12 (Thermo Fisher Scientific) supplemented with 5% inactivated FBS (Thermo Fisher Scientific) and antibiotic-antimycotic 1× (Thermo Fisher Scientific), at 37° C., under 5% $CO_2$ atmosphere.

The GaHV3 or MDV-2 virus strain SB1 (GenBank accession no.: HQ840738.1) (SEQ ID NO.1) was used for the generation of the recombinant virus rSB1-ILTV (gD-I), in CEFs cells by CRISPR/Cas9 technology and by the NHEJ repair pathway.

The ILT challenge strain used to evaluate the efficacy of the rSB1-ILTV vaccine (gD-I), was the VFAR-043 strain isolated and reported in South American countries (10.1637/11939-073018-Reg.1).

Design and Construction

The recombinant virus rSB1-ILTV (gD-I) was obtained by CRISPR/Cas9-NHEJ technology using the plasmids and sgRNAs: pGEM-sgA-GFP-mCMV-ILTV (gD-I)-Poly A, px459v2.0-sgRNA-sgA, and px459v2.0-sgRNA1-SB1/UL45-46, px459v2.0-sgRNA2-SB1/UL45-46, px459v2.0-sgRNA3-SB1/UL45-46, and px459v2.0-sgRNA4-SB1/UL45-46.

Design and Construction of sgRNAs and Donor Plasmid

Selection and Design of sgRNAs

The target sequence in this invention was the intergenic region of the UL45 and UL46 genes of the *Gallid alphaherpesvirus* 3 (SB1 strain) genome, which was submitted for gRNA design (http://crispr.mit.edu/), thus selecting 4 sequences with the highest score. The sequences are shown in Table 1.

Plasmid px459v2.0 (catalog no. 62988; Addgene, USA) was digested with BbsI-HF (Neb New England BioLabs, Inc) and then purified using the QIAquick Gel Extraction Kit (Qiagen) following the manufacturer's instructions.

sgRNAs were presented as oligo-DNA primers corresponding to the sgRNA of the target sequence, which were synthesized and cloned into the previously digested px459v2.0 cloning vector for the construction of px459v2.0-sgRNA. The sequence of sg-A was taken from a previous publication and cloned into the px459v2.0 plasmid in the same way. The correct insertion of the sgRNAs was confirmed by digestion with the enzyme BbsI-HF (data not shown).

Sequence of the non-coding intergenic region between UL45/46 of the *Gallid alphaherpesvirus* 3 (strain SB1) genome (SEQ ID NO.2)

```
Size: 119 bp
>acgcgagagaccgagcattagagtagcacttatttattctatcgcagag

aaacaccgcgcgcgttcaaaaaaaacacaggcggggtacgataaatttac

gcggccgcgctatgtttact
```

TABLE 6

Sequences of sgRNAs designed based on the 119 bp sequence of the UL45/46 intergenic region of the *Gallid alphaherpesvirus* 3 (strain SB1) genome (GenBank accession no.: HQ840738.1) https://www.ncbi.nlm.nih.gov/nuccore/HQ840738.1.

| # | sgRNA | 5'----------------------------3' | |
|---|---|---|---|
| 1 | gRNA1_UL45/46/SB1_T | CACCGGCGCGTTCAAAAAAAACAC | gT(+) |
| | gRNA1_UL45/46/SB1_B | AAACGTGTTTTTTTTGAACGCGCC | gB(-) |
| 2 | gRNA2_UL45/46/SB1_T | CACCGGTTCAAAAAAAACACAGGC | gT(+) |
| | gRNA2_UL45/46/SB1_B | AAACGCCTGTGTTTTTTTTGAACC | gB(-) |
| 3 | gRNA3_UL45/46/SB1_T | CACCGGGGGTACGATAAATTTACG | gT(+) |
| | gRNA3_UL45/46/SB1_B | AACCGTAAATTTATCGTACCCCC | gB(-) |
| 4 | gRNA4_UL45/46/SB1_T | CACCGTGTTTTTTTTGAACGCGCG | gT(+) |
| | gRNA4_UL45/46/SB1_B | AAACCGCGCGTTCAAAAAAAACAC | gB(-) |

B = Lower DNA chain, T = Upper DNA chain sgRNAs cloning procedure

Hybridization of sgRNAs

The sgRNA was synthesized as oligo:

5'CACCNNNNNNNNNNNNNNNNNNNNNNNNNNNNNNNNNNNNNNNNCAAA 5'

*The sgRNA was resuspended in nuclease-free water and diluted 1/10 to have a final working concentration of 10 μM.

1× hybridization reaction:

| Hybridization reaction | Volume |
|---|---|
| Hybridization buffer solution 1× | 2 μl |
| sgRNA upper DNA chain (10 μM) | 2 μl |
| sgRNA lower DNA chain (10 μM) | 2 μl |
| $H_2O$ | 14 μl |
| TOTAL | 20 μl |

*Hybridization buffer solution: 10 mM Tris, pH 7.5-8; 50 mM NaCl, 1 mM EDTA.

The samples were placed in the thermocycler under the following conditions:

90° C. for 3 min and 37° C. for 1 hour

The samples were quantified by spectrophotometry using Eppendorf BioPhotometer plus, obtaining an average value of 200 ng/μl. A 1/10 dilution was performed to have a working stock of 20 ng/μl.

Digestion or Linearization of the Plasmid Vector PX459-v2.0 (Catalog No. 62988; Addgene, USA)

Digestion reaction 1×:

| Digestion reaction | Reaction 1× | Volume |
|---|---|---|
| CutSmart Buffer Solution 10× | 1× | 2 μl |
| BbS I-HF enzyme (20 000 U) | 20 units | 1 μl |
| Plasmid (500 ng/ml) | 2 μg | 4 μl |
| $H_2O$ | | 12 μl |
| TOTAL | | 20 μl |

Samples were placed in the thermocycler at 37° C. for 6 hours.

An electrophoresis assay was performed in order to purify the band of interest, which contains the linear DNA. The gel was cut and the DNA was extracted using the QIAquick® Gel Extraction Kit 250. The linearized DNA was quantified and stored at 4° C.

Ligation of sgRNAs with the PX459-v2.0 Vector

The protocol described by NEB (Quick ligation protocol—M2200) was followed.

Ligation reaction 1×:

| Ligation reaction | Reaction 1× | Volume (20 μl) |
|---|---|---|
| Ligase buffer solution 2× | 1× | 10 μl |
| sgRNA (20 ng/μl) | 3× (75 ng) | |
| Plasmid | 1× (25 ng) | |
| Ligase | 1× | 1 μl |
| $H_2O$ | | Hasta 20 μl |
| TOTAL | | 20 μl |

The ligation products (sgRNA+px459-v2.0 vector) that gave rise to the new plasmids were identified:

| Name of gRNAs cloned in px459-v2.0 |
|---|
| px459v2.0-sgRNA1-SB1/UL45-46 |
| px459v2.0-sgRNA2-SB1/UL45-46 |
| px459v2.0-sgRNA3-SB1/UL45-46 |
| px459v2.0-sgRNA4-SB1/UL45-46 |

The px459v2.0-sgRNA1-SB1/UL45-46 was selected for the following cloning steps.

Transformation into Competent *E. coli* DH5a Bacteria with the Ligation Product to Obtain the Recombinant Plasmid Px459v2.0-sgRNA1-SB1/UL45-46.

The ligation product (sgRNA+vector px459-v2.0) was added to competent *E. coli* DH5a cells, followed by heat shock from 4° to 42° C.

The transformed bacteria were grown in Luria Bertani broth (LB) supplemented with the antibiotic ampicillin (100 μg/ml), and were transferred by seeding to LB agar plates supplemented with ampicillin (100 μg/ml) for subsequent selection of clones (recombinant plasmids).

Extraction and purification of the recombinant plasmid Px459v2.0-sgRNA1-SB1/UL45-46 Recombinant plasmids were selected, grown in LB broths supplemented with ampicillin (100 μg/ml), the bacterial pellet was concentrated, and the plasmid was extracted using the QIAprep® Spin Miniprep Kit (250) extraction kit, according to the manufacturer's instructions, using the QIAcube equipment and the correct insertion of the sgRNA into the plasmid pX459-v2.0 was verified through the digestion product with the BbsI-HF digestion enzyme in the 1% agarose gel electrophoresis run. Finally, the UL45-46 specific sgRNA of SB1 was named px459v2.0-sgRNA1-SB1/UL45-46.

Design and Construction of the Donor Plasmid

For the construction of the donor plasmid, two consecutive cloning processes were performed: the Open Reading Frame (ORF) of the D and I genes of ILTV (GenBank accession number: MG: MG775218.1) *Gallid alphaherpesvirus* 1 strain VFAR-043, complete genome—Nucleotide—NCBI (nih.gov) (SEQ ID NO.20), which is flanked at both ends by the SfiI restriction site (upstream and downstream). This sequence was subsequently synthesized and cloned into plasmid pUC57 by GenScript, the resulting plasmid was named pUC57-ILTV (gD-I).

The plasmid pGEM-sgA-GFP, previously constructed. This plasmid was digested and linearized by the enzyme SfiI. The plasmid pGEM-sgA-GFP (this plasmid contains: sgA+murine cytomegalovirus promoter+Sfi cleavage sites+a SV40 Poly A signal sequence+a GFP expression cassette for the expression of the fluorescence reporter gene, the latter flanked by LoxP+sgA sequences).

The plasmid pUC57-ILTV (gD-I) was digested by the enzyme SfiI to release the gD-1 cassette, then this cassette was cloned into the plasmid pGEM-sgA-GFP (linearized), the resulting plasmid was named pGEM-sgA-GFP-mCMV-ILTV (gD-I)-Poly A (9144 bp). The correct insertion and orientation of the ILTV (gD-I) expression cassette was verified by PCR using specific primers and by sequencing (data not shown).

At 24 hours post-transfection, the supernatant containing the DNA complex: Lipofectamine was removed and replaced with fresh maintenance medium, to avoid any toxicity to the cell monolayer.

At three days post transfection, infected/transfected cells were transferred and distributed into 2 6-well CEF cell culture plates previously seeded.

Four days post-transfection/infection, lysis plaques emitting GFP fluorescence were visible, corresponding to the recombinant virus. Selected clones were then purified by three rounds of plaque purification. Single cells expressing the ILTV (gD-I)-GFP expression cassette were selected and plated into 96-well cell culture plates by FACS on a BD FACSMelody™ Cell Sorter (BD Biosciences). Finally, the new recombinant virus was named rSB1-GFP-ILTV (gD-I) (SEQ ID NO. 21). The presence and expression of the ILTV (gD-I) cassette was then verified by conventional PCR, IIF, and Western blot.

Selection of Recombinant Clones rSB1-GFP-ILTV (gD-I)

Recombinant clones of rSB1-GFP-ILTV (gD-I) were evaluated by conventional PCR to confirm the correct insertion of the ILTV (gD-I)/GFP cassette into the SB1 genome post-transfection and purification. Seven clones were selected and infected into previously seeded CEF cells, then trypsinized upon reaching an infection percentage of 70%. Viral DNA was extracted and analyzed by conventional PCR using the following specific primers: MDV2-UL45-UL46 F2/MDV2-UL45-UL46 R2 (Data not shown).

TABLE 7

List of primers and sgRNAs used in this invention study

| SB1 (MDV-2) primers and sgRNAs | Address | Sequences (5'-> 3') | SEQ No. |
|---|---|---|---|
| MDV2-UL45-UL46 F2 | Forward primer | GCAACGCTACCGAGCTAGAA | SEQ ID NO. 10 |
| MDV2-UL45-UL46 R2 | Reverse primer | AACCCTCCCTGCCACTTTTT | SEQ ID NO. 11 |
| gRNA1_UL45/46/SB1_T | Upper chain | CACCGGCGCGTTCAAAAAAAACAC | SEQ ID NO. 14 |
| gRNA1_UL45/46/SB1 B | Lower chain | AAACGTGTTTTTTTTGAACGCGCC | SEQ ID NO. 15 |
| SB1_UL45-F | Forward primer | TATGCGGTTGTACGATCGGG | SEQ ID NO. 16 |
| SB1_ILTV_UL45-R | Reverse primer | AGAAACGTTCCGGAAGGGAC | SEQ ID NO. 17 |
| SB1_EGFP_UL46-F | Forward primer | CCACTCCCACTGTCCTTTCC | SEQ ID NO. 18 |
| SB1_ILTV_UL46-R | Reverse primer | GTTGTGCTTCTACGACGGGA | SEQ ID NO. 19 |

Generation of the Recombinant rSB1-GFP-ILTV (gD-I)

$0.5\times10^6$ CEF cells were seeded per well in a 6-well cell culture plate supplemented with maintenance medium (DMEM 1×+5% FBS) at 37° C. under 5% $CO_2$ atmosphere. After 24 hours, the supernatant was removed and the monolayer was washed 3 consecutive times with DPBS 1× to remove cellular debris. Cells were infected with SB1wt with MOI of 0.001 for 8 hours at 37° C. and 5% $CO_2$ in DMEM 1×+5% FBS medium.

The next day, 1 μg of plasmid pGEM-sgA-GFP-mCMV-ILTV (gD-I)-Poly A containing the mCMV-ILTV (gD-I)-Poly A cassette, 0.5 μg of sgRNA-sgA, and 0.5 μg sgRNA SB1 UL45-46, were co-transfected for 24 hours using Lipofectamine® Reagent (Thermo Fisher Scientific) following the manufacturer's instructions.

Removal of the GFP Reporter Cassette by the Cre-Lox System

The GFP expression cassette (flanked by LoxP sequences) from rSB1-GFP-ILTV (gD-I) was removed by the Cre-Lox system. A monolayer of CEF cells was prepared in a 6-well cell culture plate and then infected with rSB1-GFP-ILTV (gD-I) virus with MOI of 0.01 for 24 hours. The infected monolayer was then co-transfected with 2 μg of Cre-recombinase using Lipofectamine® Reagent (Thermo Fisher Scientific) following the manufacturer's instructions.

After 12 hours post-transfection the culture medium was changed to avoid any cytotoxic effect. Verification of the complete removal of the GFP reporter gene expression cassette was confirmed by the appearance of new non-fluorescent lysis plaques. Finally, the new recombinant virus obtained was named rSB1-ILTV (gD-I) (SEQ ID NO.22).

Selection of Recombinant rSB1-ILTV (gD-I) Clones after Removal of the GFP Reporter Cassette Verification of the complete removal of the GFP reporter cassette in the rSB1-GFP-ILTV (gD-1) clones was verified by conventional PCR using specific primers: MDV2-UL45-UL46 F2/MDV2-UL45-UL46 R2. Likewise, these same primers allowed the integrity of the ILTV (gD-I) expression cassette in SB1 to be evaluated.

Indirect Immunofluorescence Assay (IIF)

CEF cells were grown in 6-well cell culture plate and infected with MOI of 0.001 with SB1wt and rSB1-ILTV (gD-I) at passages 10, 15, 20, and 25. After 48 hours post-infection (hpi), cells were washed three times with 1×DPBS and then fixed with 4% paraformaldehyde for 30 min at room temperature. Cells were incubated with the primary antibody in a solution of 5% bovine serum albumin (BSA) in DPBS for 1 h at room temperature. A primary antibody: anti-Infectious laryngotracheitis serum (catalog no. N0118) (Avian Vaccine Services, LLC dba AVS Bio, Norwich, USA) for detection of gD-I glycoprotein expression. After three washes with DPBS 1×, cells were incubated with a secondary antibody goat anti-chicken IgY H&L Alexa Fluor®488 at a dilution of 1:1000 (catalog no. ab150169, Abcam, Cambridge, MA, USA) (green fluorescence), respectively in 1×DPBS with 5% BSA for 1 hour at room temperature. Results were observed using an ObserverA1 fluorescence microscope (Carl Zeiss, Germany). Digital images were taken at 200× magnification and processed with the AxioCam MRc5 camera (Carl Zeiss, Germany).

Western Blot for Detection of ILTV Glycoproteins D-I (gD-I)

To assess the expression of ILTV gD-I glycoproteins, CEF cells were infected with the recombinant virus with MOI of 0.01. At 72 hpi, CEF cells were lysed and analyzed by Western blot. Western blot analysis was performed using a primary antibody: anti-serum Infectious laryngotracheitis (Catalog No. N0118, Avian Vaccine Services, LLC dba AVS Bio, Norwich, USA) diluted 20/5000 in 1% milk in 0.1% PBST for 15 hours at room temperature with constant agitation. Subsequently, three washes were performed with 0.1% T-TBS (each wash for 10 min with constant agitation). After finishing the washes, the membrane was incubated with the secondary antibody Goat Anti-Chicken IgY (H&L) [HRP](Catalog No. A00165, GenScript, Piscataway, NJ, USA) diluted 1/5000 in 1% milk in 0.1% PBS-T for 2 hours at room temperature with constant agitation.

Visualizations of protein expression were detected using a photodocumenter and an AZURE CCD camera (Azure Biosystems, Inc., Dublin, USA).

In Vitro Genetic Stability of rSB1-ILTV (gD-I).

Genetic stability was assessed in CEFs up to passage 20. Viral DNA was extracted from infected CEF cells, and the presence of the ILTV cassette and insert (gD-I) was verified every 5 passages, which was confirmed by conventional PCR using specific primers MDV2-UL45-UL46 F2/MDV2-UL45-UL46 R2. Expression of gD-I glycoproteins was assessed every 5 passages by Western blot assay, as previously described in the Western blot section.

Experimental Design No. 1: Immunization of Broilers with the rSB1-ILTV Vaccine (gD-I)

For the immunization experiment, three recombinant virus clones obtained rSB1-ILTV (gD-I) clones were evaluated: 15.1, 16.3, 15.7, a commercial rHVT-ILTV vaccine was used as a control, isolated rHVT-ILTV, and a non-immunized control group.

Seventy-two 1-day-old broilers were randomly divided into six groups: Group No. 1=rSB1-ILTV (gD-I) clone 15.1 (n=12), Group No. 2=rSB1-ILTV (gD-I) clone 16.3 (n=12), Group No. 3=rSB1-ILTV (gD-I) clone 15.7 (n=12), Group No. 4=HVT-ILTV (commercial) (n=12), Group No. 5=rHVT-ILTV isolated (n=12) and Group No. 6=non-immunized control (n=12). Chicks were immunized with a dose of 3000 PFU/bird, at 20, 34, and 41 days post-immunization, serum samples were collected to evaluate the humoral immune response by detecting specific antibodies against glycoprotein I (gI) of ILTV, using IDScreen ILT I Indirect (ID.Vet Cat. No ILTGIS).

To assess efficacy against ILTV challenge, immunized and non-immunized birds were partially moved to the BSL-3 facility of FARVET S.A.C. Birds were challenged at 42 days post-immunization by ocular (50 μl in each eye) and intra-tracheal (50 μl) routes and clinical signs were monitored for 10 days, which were recorded and reported daily. Scores for clinical signs were designated as 0=no clinical signs; 1=conjunctivitis, difficulty breathing, or mild hoarseness; 2=conjunctivitis, difficulty breathing, or moderate hoarseness; 3=conjunctivitis, difficulty breathing, or severe hoarseness.

To determine viral shedding, oral and cloacal swabs were collected (3, 5, and 7 d.p.d.) from immunized and non-immunized birds, respectively. Following collection, the swabs were immediately soaked in 1 ml of PBS 1× supplemented with antibiotic-antimycotic (final concentration of 10×) for a resting time of 30 min at 4° C. Each swab was then removed, and the supernatant was clarified to remove cellular debris and/or feed/fecal residue by centrifugation at 3000 rpm for 15 min at 4° C. Samples were quantified by quantitative real-time PCR technique.

Statistical Analysis

All statistical analysis was performed using GraphPad Prism version 8.01 (GraphPad Software, San Diego, CA). The two-way Anova test was used to compare data between different groups. Differences were considered with a p value <0.0001. Elisa titers were analyzed using Turkey's multiple comparison test at 95%.

Results:

Construction and Recovery of the Recombinant Virus

Figure 7:
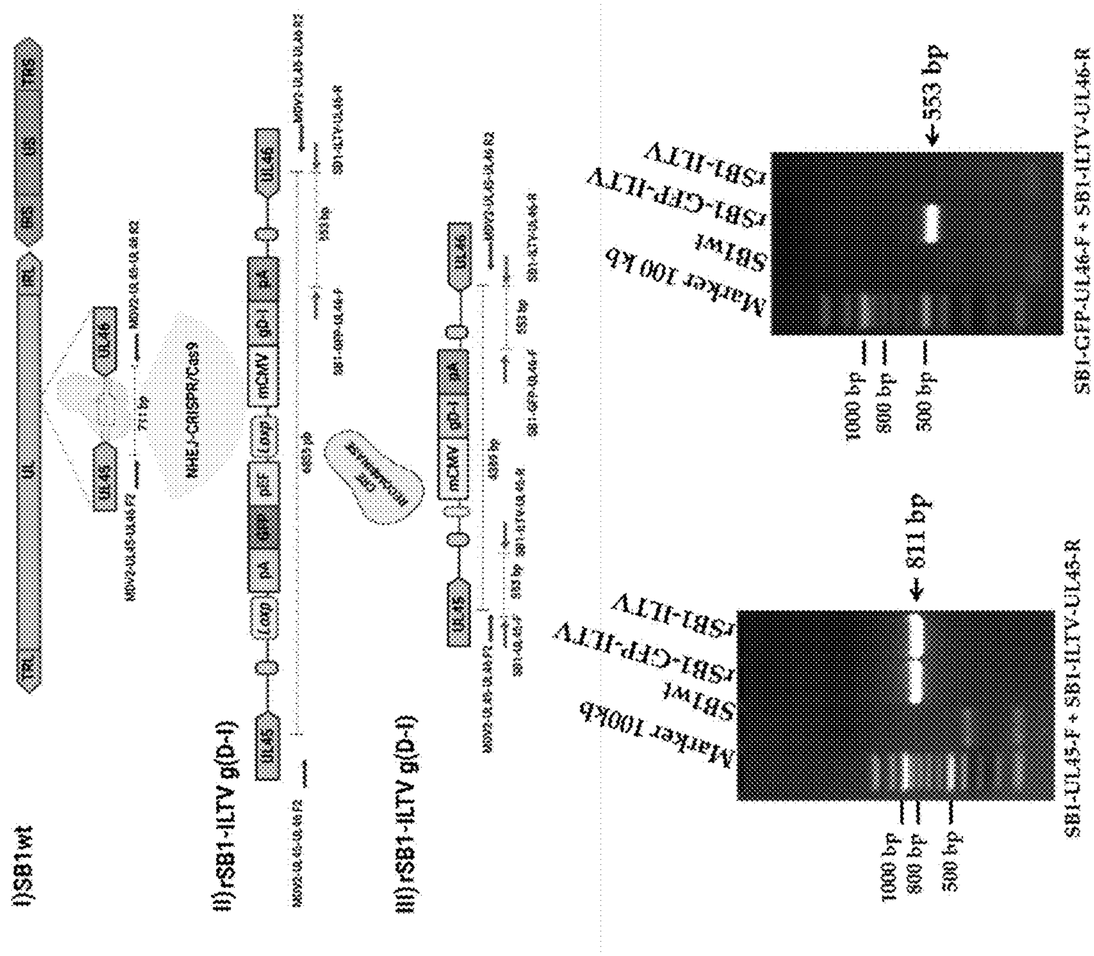
FIG. 7 shows the strategy used for the generation of the rSB1-ILTV (gD-I) virus by CRISPR/Cas9-NHEJ technology. (A) The genome of the parental virus, or SB1wt, is shown with a unique long region (UL), a unique short region (US), and a long (TRL/IRL) and short (TRS/IRS) internal repeat region. Strategy used for the generation of rSB1-ILTV (gD-I) by CRISPR/Cas9-NHEJ. This figure was created with BioRender.com (Figure not scaled). (B) Confirmation of the correct insertion of the ILTV D-I gene expression cassette into the rSB1-GFP-ILTV and rSB1-ILTV genomes was demonstrated using specific primers by conventional PCR.

The sgRNAs (sgRNA-sgA and sgRNA-UL45-46) were designed, synthesized, and cloned into plasmid px459v.20, which contains the *S. pyogenes* Cas9 gene. The resulting plasmids were named px459v2.0-sgRNA-sgA and px459v2.0-sgRNA-UL45-46. The donor plasmid pGEM-sgA-GFP-mCMV-ILTV (gD-I)-Poly A contains the GFP reporter expression cassette which is flanked by two LoxP sequences for its separation from the ILTV (gD-I) expression cassette. The two cassettes were flanked by sg-A sites to introduce a desired cleavage for cassette release and integration into the UL45-46 intergenic region of the SB1wt genome. The Cas9 endonuclease promotes the insertion of the GFP and ILTV cassette into the UL45-46 intergenic region of the SB1wt genome, see FIG. 7.

For generation of rSB1-GFP-ILTV (gD-I) virus, CEF cells were co-transfected with the Poly A plasmids pGEM-sgA-GFP-mMCV-ILTV (gD-I), px459v2.0-sgRNA-sgA, and px459v2.0-sgRNA-UL45-46. At 24 hours post-transfection, cells were infected with SB1wt virus with MOI of 0.01. Plaques expressing GFP were visible at 4 days post-transfection/infection, demonstrating successful cassette insertion. Recombinant virus was isolated in three rounds of purification by plaque isolation and Cell Sorter.

Figure 9:
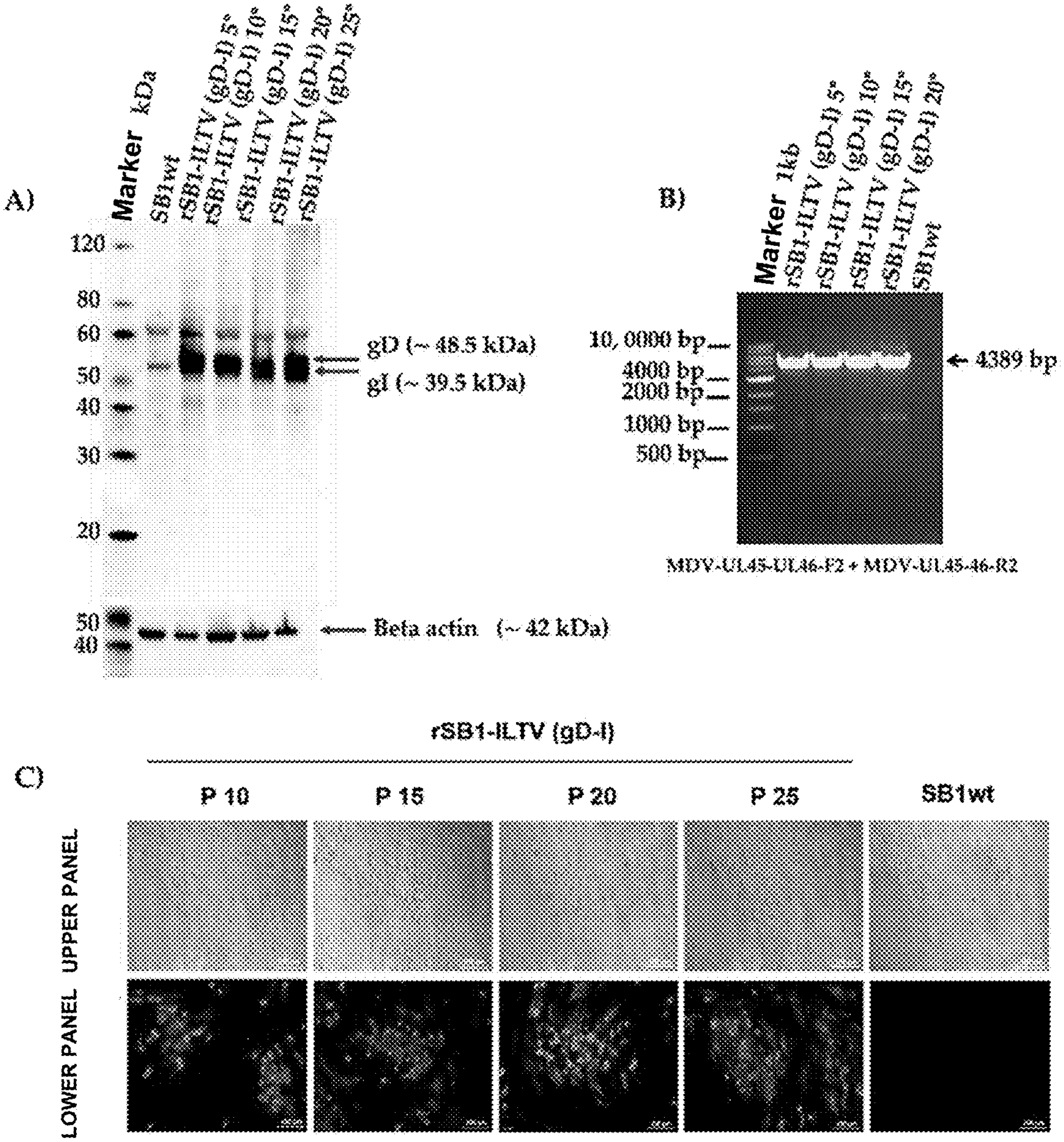
FIG. 9 shows the in vitro evaluation of the stability of the expression cassette containing the genes encoding the ILTV glycoproteins D and I in the *Gallid alphaherpesvirus* 3 genome. CEF cells were infected with the rSB1-ILTV virus (gD-I). (A) The expression of glycoproteins D and I was evaluated in CEF cells infected with rSB1-ILTV (gD-I) by Western blot every 5 passages (passage 5 to 25), where we detected a band of ~48.5 kDa corresponding to glycoprotein D (gD) and a band of ~39.5 kDa corresponding to glycoprotein I (gI). As a run control, beta-actin (β-actin) ~42 kDa was detected and as a negative control of the experiment, CEF cells infected with SB1wt were used, in which no band was detected. (B) Every 5 passages (passage 5 to 20) the presence of the inserted cassette containing the genes encoding the glycoproteins D and I of ILTV in the genome of rSB1-ILTV (gD-I) was evaluated by conventional PCR using specific primers, SB1wt was used as a control. (C) The indirect immunofluorescence assay (IIF) demonstrated the expression of glycoproteins D and I (green fluorescence) in cells infected with the recombinant virus rSB1-ILTV (gD-I), at passages 10, 15, 20, 25 in CEFs. Lower panel (fluorescence emission) and upper panel (bright field). CEF cells infected with SB1wt were used as negative control. Digital images were captured at 200× magnification and processed with the AxioCam MRc5 camera (Carl Zeiss, Germany).

Subsequently, the removal of the GFP reporter cassette was performed with Cre-recombinase (pcDNA3.1-Cre) treatment through Cre-LoxP system, the cells infected with the virus rSB1T-GFP-ILTV (gD-I) were transfected with Cre-recombinase, the appearance of lysis plaques without fluorescence emission was visible at 4 days post-transfection/infection. The complete removal was confirmed by conventional PCR using specific primers MDV2-UL45-UL46 F2 and MDV2-UL45-UL46 R2 (FIG. 9B). Finally, the new recombinant SB1 was named rSB1-ILTV (gD-I).

Selection of Clones after Removal of GFP Reporter Cassette

Figure 8:
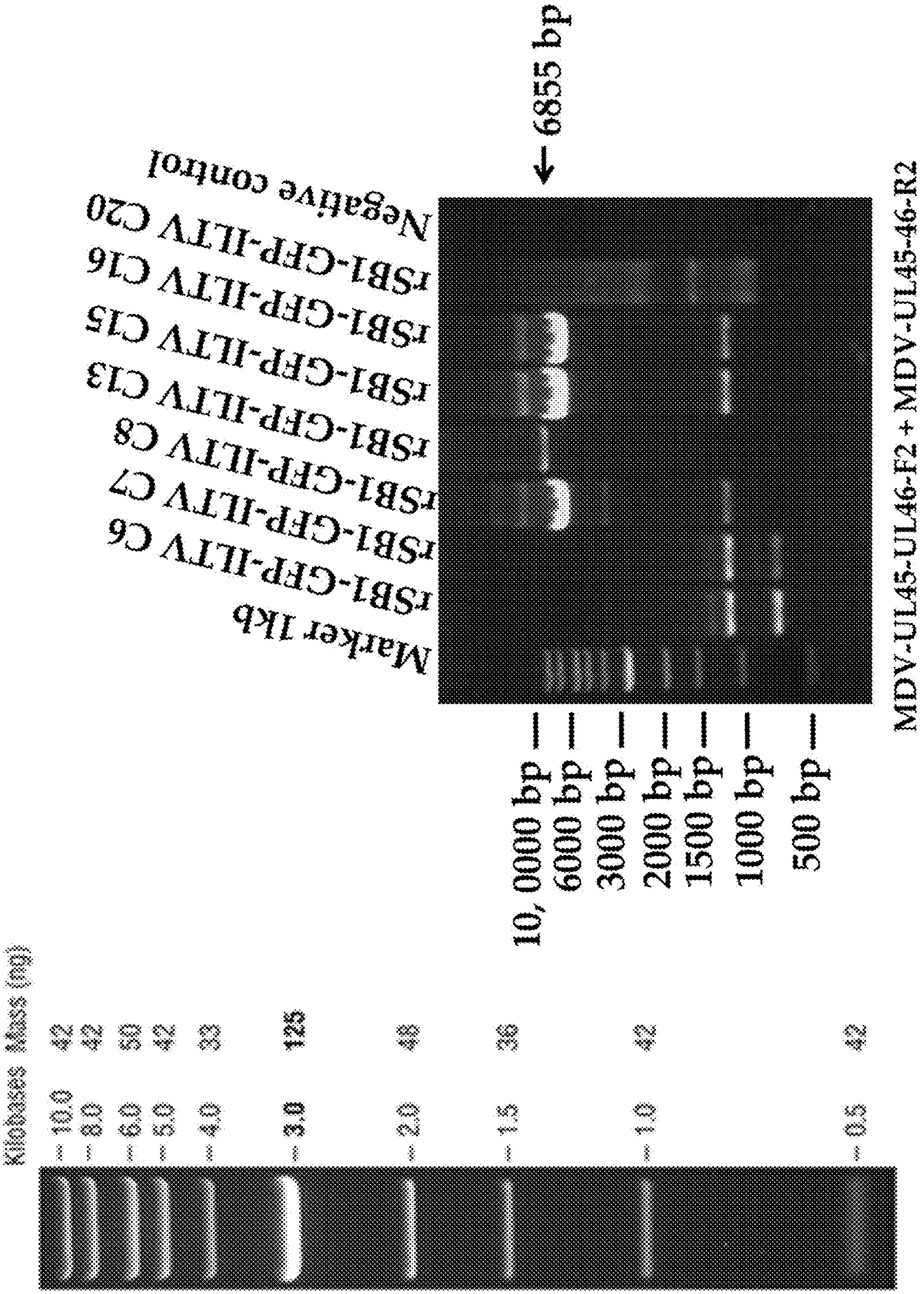
FIG. 8 shows the evaluation and selection of recombinant clones by conventional PCR of rSB1-GFP-ILTV (gD-I) obtained from the transfection stage. The 20 recombinant clones: C6, C7, C8, C13, C15, C16, and C20 were evaluated by PCR with specific primers that amplify the complete expression cassette, the product amplified an expected band of 6855 bp.

Clones C8, C15 and C16 of the rSB1-GFP-ILTV virus (gD-I) presented the expected size of 6855 bp (FIG. 8) before the removal of the GFP reporter cassette, therefore they were selected for the removal of the GFP reporter cassette.

After removal of the GFP reporter cassette, seven recombinant clones rSB1-ILTV (gD-I) were selected, from which the complete removal of the GFP reporter cassette was verified by conventional PCR using specific primers: MDV2-UL45-UL46 F2/MDV2-UL45-UL46 R2. Demonstrating the complete removal of the reporter cassette and the integrity of the ILTV (gD-1) cassette in the UL45-46 intergenic region of the *Gallid alphaherpesvirus* 3 (SB1) genome.

Stability of Genes D and I in the Genome of the Recombinant Virus rSB1-ILTV (gD-I)

CEFs cells were infected with the rSB1-ILTV virus (gD-I) virus to determine the genetic stability of the virus by indirect immunofluorescence (IIF), polymerase chain reaction (PCR) and Western blotting. Viral DNA was analyzed every 5 passages (passages 5 to 20) by conventional PCR where we detected the presence of the cassette inserted in the recombinant virus genome with a band of ~4389 bp (FIG. 9B). Similarly, every 5 passages (passage 5 to 25) we confirmed the expression of glycoproteins D and I by Western blotting (FIG. 9A) where we detected two bands: a band of ~48.5 kDa corresponding to glycoprotein D (gD) and a band of ~39.5 kDa corresponding to glycoprotein I (gI). As a run control, beta-actin (β-actin) ~42 kDa was detected and as a negative control of the experiment, CEF cells infected with SB1wt were used, in which the expression of the proteins of interest was not detected. The IIF demonstrated the expression of both glycoproteins gD-I in cells infected with the recombinant virus at passages 10 to 25 in CEFs (FIG. 9C). These results demonstrated that the presence and expression of the ILTV glycoprotein gD-I gene did not affect the replication of the recombinant virus, confirming the stability of glycoproteins D and I in the viral genome of the recombinant virus.

Humoral Immune Response

Immunogenicity was evaluated through the humoral immune response elicited by the vaccines, sera from chicks were collected and evaluated through an indirect ELISA specific for the detection of glycoprotein I (gI) IDScreen ILT gI Indirect (ID. Vet, Cat. No. ILTGIS) at 1 day of pre-immune age, 21, 34, 42, and 49 days post-immunization.

Relatively high titers were detected at 1 day of age, which correspond to maternal antibodies (Data not shown).

Figure 10A:
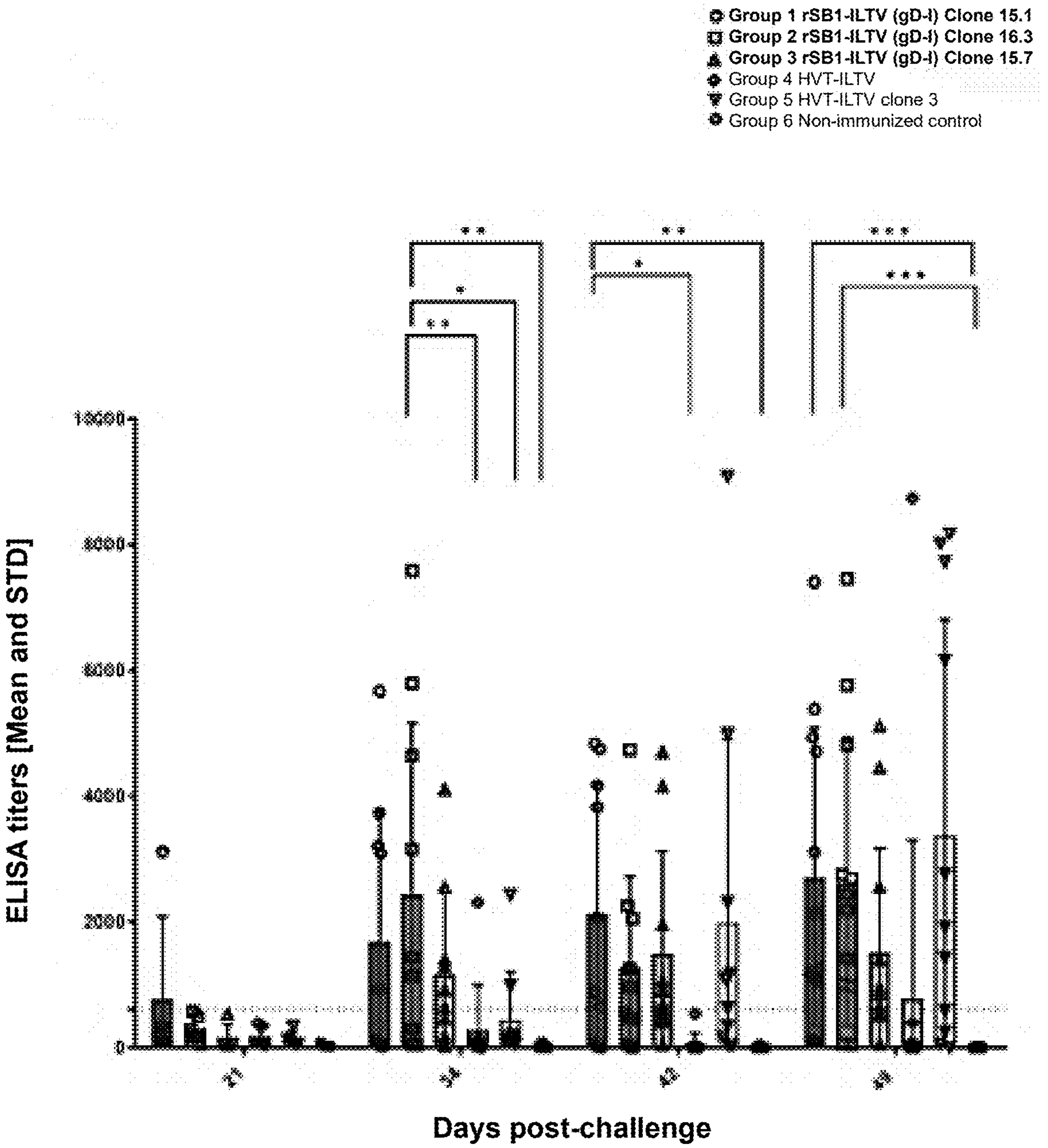
FIG. 10 shows the results of the evaluation of the humoral immune response by a specific ELISA assay to glycoprotein I (gI) IDScreen ILT gI Indirect (ID. Vet, Cat. No. ILTGIS) and the survival percentage of experiment No. 1 in broilers. (A) Antibodies were monitored in serum samples at 21-, 34-, 42-, and 49-days post-immunization, using an ELISA kit specific for glycoprotein I of ILTV. Mean titers and standard deviation are represented by a horizontal bar and whiskers. Positive samples were considered above the cut-off limit (Cut off: ≥611 titer). (B) Score of clinical signs. The groups of birds were challenged with an ILTV strain at 42 days post-vaccination. Subsequently, clinical signs were monitored until day 10 post-challenge. Clinical sign scores were designated as: 0=no clinical signs; 1=conjunctivitis, difficulty breathing, or mild hoarseness; 2=conjunctivitis, difficulty breathing, or moderate hoarseness; 3=conjunctivitis, difficulty breathing, or severe hoarseness. (C) Viral shedding of the challenge virus. Tracheal swabs were collected on days 3, 5, and 7 post-challenge from groups of birds (n=7). The viral load of the challenge virus was determined by quantitative real-time PCR with detection of the ILTV glycoprotein B (gB) gene.

At 21 dpv, one bird from group 1 clone 15.1 demonstrated a high antibody titer, with no significance. On the contrary, at 34 dpv, ELISA results showed statistically significant higher titers in group 1 (clone 15.1) and group 2 (clone 16.3) compared to the unvaccinated group. At 42 dpv, titers were statistically significantly higher in vaccinated groups 1 and 2 compared to the unvaccinated group by two-way ANOVA analysis (FIG. 10A). Results were interpreted as positive at titers 611.

Efficacy in the Face of the ILTV Challenge

The efficacy of the rSB1-ILTV (gD-I) vaccine was evaluated taking into account the clinical signs score and viral shedding.

Figure 10B:
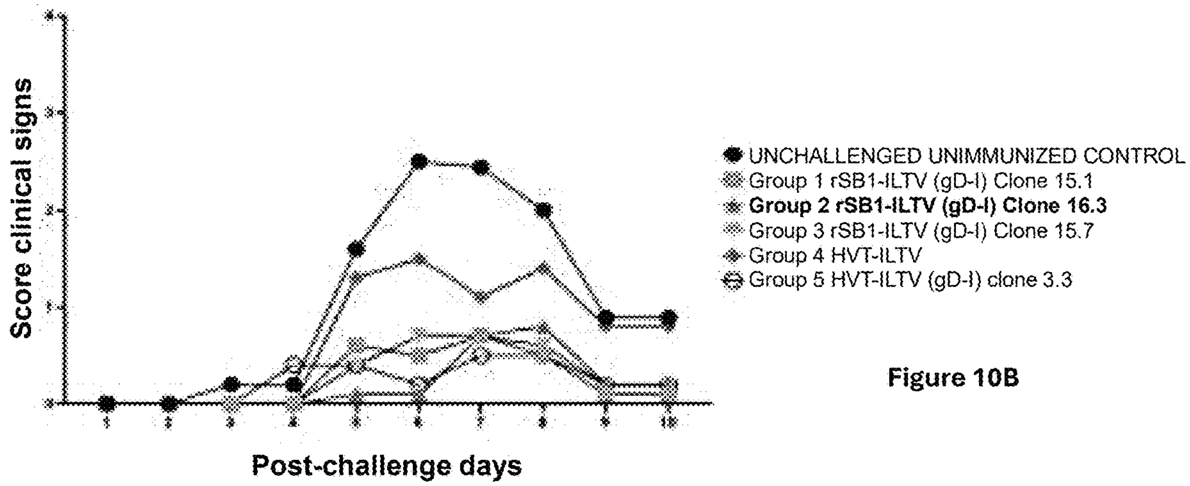

The experimental bird groups were challenged with an infectious laryngotracheitis virus strain at 42 days post-vaccination via ocular (50 μL in each eye) and intratracheal (50 μL) routes and clinical signs were monitored for 10 days. Thereafter, the mean clinical sign scores were higher in the non-immunized bird groups and the group of birds immunized with the rHVT-ILTV vaccine (commercial) which indicated the severity of symptoms in these groups. In addition, it is worth noting that one bird died with severe disease symptoms in the non-immunized group. On the other hand, the groups of birds immunized with the vaccines rSB1-ILTV (gD-I) clone 15.1, rSB1-ILTV (gD-I) clone 16.3, rSB1-ILTV (gD-I) clone 15.7, and rHVT-ILTV isolated showed a lower score of clinical signs with significant difference (FIG. 10B).

Figure 10C:
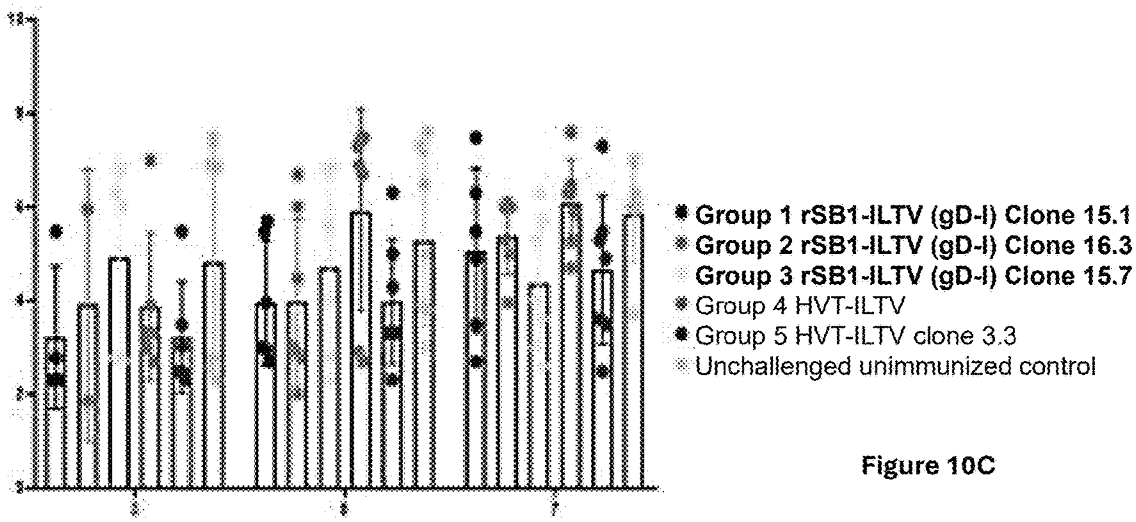

The bird groups in experiment No. 1 were challenged with an infectious laryngotracheitis virus strain at 42 days post-vaccination by ocular (50 μl in each eye) and intratracheal (50 μl) routes. Then, to evaluate the viral dissemination of the challenge virus, tracheal swabs were collected on days 3, 5 and 7 post-challenge to be evaluated by the quantitative real-time PCR technique. Subsequently, the copies/μL averages were higher in the groups of non-immunized birds and the group of birds immunized with the rHVT-ILTV vaccine (commercial), which could indicate a greater viral dissemination in these groups. On the other hand, groups of birds immunized with rSB1-ILTV (gD-I) clone 15.1, rSB1-ILTV (gD-I) clone 16.3, rSB1-ILTV (gD-I) clone 15.7 and rHVT-ILTV (gD-I) isolated vaccines showed a lower average of copies/μl (FIG. 10C).

List of Sequences:

SEQ ID NO.16 Nucleotide sequence of the primer or forward primer SB1_UL45-F in the 5' to 3' direction
Length: 20 bp.

SEQ ID NO.17 Nucleotide sequence of primer or reverse primer SB1_ILTV_UL45-R in the 5' to 3' direction
Length: 20 bp.

SEQ ID NO.18 Nucleotide sequence of the primer or forward primer SB1_EGFP_UL46-F in the 5' to 3' direction
Length: 20 bp.

SEQ ID NO.19 Nucleotide sequence of the primer or reverse primer SB1_ILTV_UL46-R in the 5' to 3' direction
Length: 20 bp.

SEQ ID NO.20 Nucleotide sequence of glycoproteins D and I of ILTV strain VFAR-043, with GenBank accession number: MG775218.1
Length: 3570 bp.

SEQ ID NO.21 Nucleotide sequence of the rSB1-GFP-ILTV (gD-I) virus of strain VFAR-043
Length: 172,133 bp.

SEQ ID NO.22 Nucleotide sequence of the rSB1-ILTV (gD-I) virus of strain VFAR-043
Length: 169,667 bp.

Example 3

Construction, immunogenicity and protective efficacy of *Gallid alphaherpesvirus* 3 (GaHV3) efficiently expressing the Gumboro disease virus (IBDV) glycoprotein VP2 in broilers.

III. Methodology

Animals

One-day-old broilers (Experiment No. 1) were used to evaluate the immunogenicity and efficacy of the rSB1-VP2 vaccine against Gumboro disease virus (IBDV).

Cells and Viruses

For the generation and maintenance of the recombinant virus rSB1-VP2, CEF cells harvested from 9-10-day old SPF embryonated eggs (Charles River Avian Vaccine Services, Norwich, USA) were used. CEFs cells were maintained in DMEM/F12 (Thermo Fisher Scientific) supplemented with 5% inactivated FBS (Thermo Fisher Scientific) and antibiotic-antimycotic 1× (Thermo Fisher Scientific), at 37° C., under 5% $CO_2$ atmosphere.

The GaHV3 or MDV-2 virus strain SB1 (GenBank accession no.: HQ840738.1) (SEQ ID NO.1) was used for the generation of the recombinant virus rSB1-VP2, in CEFs cells by CRISPR/Cas9 technology and by the NHEJ repair pathway.

The IBDV challenge strain used to evaluate the efficacy of the rSB1-VP2 vaccine was the F52/70 strain administered ocularly with a titer of $10^4$ $DIE_{50}$ (30 μl/dose).

Design and Construction

The recombinant virus rSB1-VP2 was obtained by CRISPR/Cas9-NHEJ technology using the plasmids and sgRNAs: pGEM-sgA-GFP-VP2, px459v2.0-sgRNA-sgA, px459v2.0-sgRNA1-SB1/US2, and px459v2.0-sgRNA2-SB1/US2.

Design and Construction of sgRNAs and Donor Plasmid

Selection and Design of sgRNAs

The target sequence in this invention was the US2 gene region of the *Gallid alphaherpesvirus* 3 (MDV-2) genome, which was submitted for gRNA design (http://crispr.mit.edu/), thus selecting 3 sequences with the highest score. The sequences are shown in Table 1.

Plasmid px459v2.0 (catalog no. 62988; Addgene, USA) was digested with BbsI-HF (Neb New England BioLabs, Inc) and then purified using the QIAquick Gel Extraction Kit (Qiagen) following the manufacturer's instructions.

sgRNAs were presented as oligo-DNA primers corresponding to the sgRNA of the target sequence were synthesized and cloned into the previously digested px459v2.0 cloning vector for the construction of px459v2.0-sgRNA. The sequence of sg-A was taken from a previous publication and cloned into the px459v2.0 plasmid in the same way. The correct insertion of the sgRNAs was confirmed by digestion with the enzyme BbsI-HF (data not shown).

Sequence of the US2 gene region in the *Gallid alphaherpesvirus* 3 (strain SB1) genome (SEQ ID NO.33)

```
Size: 816 bp
>tcattcggaagttataactgccgccttcgcacatttctttttgtcctgt

tttgtattgccataacagataggaattgaaacctgatcctcctgtttttt

gcagcatggccagcaacagaatactttgtcggatcgactacttgcgcgag

atggttccgttcttggaggtttcggcgggtcgggtggagaacctattatt

ttatacacacacgtcataccgttgtcgcgaaaatgttctttgtcttctgc

cgtctcgaacgtcggttcccacgtagacgttaggagcgttggaatggtat

caggaagagcccacggcatgccggaccaagtacccgctactttgaccgcg

agcagtctcttcggtaatgggatgtattccagagcagcgcggcagagatc

agcggcccccactatccacagactgtatgaagtgttttctgaaacatcgg

actccaacatcaaatatccagacataacatcttgccattcggaagcacat

ccgccgacatcttcaaatagcctaactataaacgagtctctagttcctgc

taacccagtacctcgaatgccagtcccatccggtgggttcgtcctgataa

tcggtctctgacgccgaggaagaactaaaaggggtctggaaaagcggaac

agatctgcagaccgaacgactacagacacgcccacatcatcatgtatctg

ttccatgcattgctttatgagaaaaatccataaggccgaggcggcatctc

tagatctcccggggagtctctcgcactcatctaggagagtgacgacagtt

atcatagacacgcccat
```

TABLE 1

Sequences of sgRNAs designed based on the 816 bp sequence of the US2 gene region of the *Gallid alphaherpesvirus* 3 (strain SB1) genome (GenBank accession no.: HQ840738.1) https://www.ncbi.nlm.nih.gov/nuccore/HG974565.1

| # | sgRNA | 5'----------------------------3' | |
|---|---|---|---|
| 1 | gRNA1_US2/SB1_T | CACCGAGAAAAATCCATAAGGCCG | gT(+) |
| | gRNA1_US2/SB1_B | AAACCGGCCTTATGGATTTTTCTC | gB(-) |
| 2 | gRNA2_US2/SB1_T | CACCGGAATGCCAGTCCCATCCGG | gT(+) |
| | gRNA2_US2/SB1_B | AAACCCGGATGGGACTGGCATTCC | gB(-) |

sgRNA cloning procedure

Hybridization of sgRNAs

The sgRNA was synthesized as oligo:

5'CACCNNNNNNNNNNNNNNNNNNNNNNNNNNNNNNNNNNNNNNNNNNCAAA 5'

*The sgRNA was resuspended in nuclease-free water and diluted 1/10 to have a final working concentration of 10 μM.

1× hybridization reaction:

| Hybridization reaction | Volume |
|---|---|
| Hybridization buffer solution 1× | 2 μl |
| sgRNA upper DNA chain (10 μM) | 2 μl |
| sgRNA lower DNA chain (10 μM) | 2 μl |
| $H_2O$ | 14 μl |
| TOTAL | 20 μl |

*Hybridization buffer solution: 10 mM Tris, pH 7.5-8; 50 mM NaCl, 1 mM EDTA.

The samples were placed in the thermocycler under the following conditions:

90° C. for 3 min and 37° C. for 1 hour.

The samples were quantified by spectrophotometry using Eppendorf BioPhotometer plus, obtaining an average value of 200 ng/μl. A 1/10 dilution was performed to have a working stock of 20 ng/μl.

Digestion or Linearization of the Plasmid Vector PX459-v2.0 (Catalog No. 62988; Addgene, USA)

| Digestion reaction 1×: | | |
|---|---|---|
| Digestion reaction | Reaction 1× | Volume |
| CutSmart Buffer Solution 10× | 1× | 2 μl |
| BbS I-HF enzyme (20 000 U) | 20 units | 1 μl |
| Plasmid (500 ng/ml) | 2 μg | 4 μl |
| $H_2O$ | | 12 μl |
| TOTAL | | 20 μl |

The samples were placed in the thermocycler at 37° C. for 6 hours.

An electrophoresis assay was performed to purify the band of interest, which contains linear DNA. The gel was cut and the DNA was extracted using the QIAquick® Gel Extraction Kit 250. The linearized DNA was quantified and stored at 4° C.

Ligation of sgRNAs with the PX459-v2.0 Vector

The protocol described by NEB (Quick ligation protocol—M2200) was followed.

| Ligation reaction 1×: | | |
|---|---|---|
| Ligation reaction | Reaction 1× | Volume (20 μl) |
| Ligase buffer solution 2× | 1× | 10 μl |
| sgRNA (20 ng/μl) | 3× (75 ng) | |
| Plasmid | 1× (25 ng) | |
| Ligase | 1× | 1 μl |
| $H_2O$ | | Up to 20 μl |
| TOTAL | | 20 μl |

The ligation products (sgRNA+vector px459-v2.0) that gave rise to the new plasmids were identified:

| Name of gRNAs cloned in px459-v2.0 |
|---|
| px459v2.0-sgRNA1-SB1/US2 |
| px459v2.0-sgRNA2-SB1/US2 |

Both px459v2.0-sgRNA1-SB1/US2 and px459v2.0-sgRNA2-SB1/US2 were selected for the following cloning steps.

Transformation into Competent *E. coli* DH5a Bacteria with the Ligation Product to Obtain the Recombinant Plasmid Px459v2.0-sgRNA1-SB1/US2 and px459v2.0-sgRNA2-SB1/US2

The ligation product (sgRNA+px459-v2.0 vector) was added onto competent *E. coli* DH5a cells, followed by heat shock from 4° to 42° C.

The transformed bacteria were grown in LB broth supplemented with the antibiotic ampicillin (100 μg/ml) and transferred by plating onto LB agar plates supplemented with ampicillin (100 μg/ml) for subsequent selection of clones (recombinant plasmids).

Extraction and Purification of the Recombinant Plasmid px459v2.0-sgRNA1-SB1/US2 and px459v2.0-sgRNA2-SB1/US2

Recombinant plasmids were selected, grown in LB broths supplemented with ampicillin (100 μg/ml), the bacterial pellet was concentrated, and the plasmid was extracted using the QIAprep® Spin Miniprep Kit (250) extraction kit, according to the manufacturer's instructions, using the QIAcube equipment and the correct insertion of the sgRNA into the plasmid pX459-v2.0 was verified through the digestion product with the BbsI-HF digestion enzyme in the 1% agarose gel electrophoresis run. Finally, the US2-specific sgRNA from SB1 was named: px459v2.0-sgRNA1-SB1/US2 and px459v2.0-sgRNA2-SB1/US2.

Design and Construction of the Donor Plasmid

For the construction of the donor plasmid, two consecutive cloning processes were performed: the open reading frame (ORF) of the IBDV VP2 gene (GenBank accession number: HG974565.1) (SEQ ID NO. 34), which is flanked at both ends by the SfiI restriction site (upstream and downstream). This sequence was subsequently synthesized and cloned into plasmid pUC57 by GenScript, the resulting plasmid was named pUC57-VP2.

The plasmid pGEM-sgA-GFP, previously constructed. This plasmid was digested and linearized by the enzyme SfiI. The plasmid pGEM-sgA-GFP (this plasmid contains: sgA+murine cytomegalovirus promoter+Sfi cleavage sites+a SV40 Poly A signal sequence+a GFP expression cassette for the expression of the fluorescence reporter gene, the latter flanked by LoxP+sgA sequences).

The plasmid pUC57-VP2 was digested by the enzyme SfiI to release the VP2 cassette, then this cassette was cloned into the plasmid pGEM-sgA-GFP (linearized), the resulting plasmid was named pGEM-sgA-GFP-mCMV-VP2-Poly A (8586 bp).

The correct insertion and orientation of the IBDV expression cassette (VP2) was verified by PCR using specific primers and by sequencing (data not shown).

TABLE 8

| List of primers and sgRNAs used in this invention study | | | |
|---|---|---|---|
| *Gallid alphaherpesvirus* (GaHV-3) primers and sgRNAs | Direction | Sequences (5'-> 3') | SEQ No. |
| MDV2-US2-5F | Forward primer | GGTATCAGGAAGAGCCCACG | SEQ ID NO.23 |
| MDV2-US2-5R | Reverse primer | GATCTAGAGATGCCGCCTCG | SEQ ID NO.24 |
| MDV2-US2-6F | Forward primer | TGTCGGATCGACTACTTGCG | SEQ ID NO.25 |
| MDV2-US2-VP2-6R | Reverse primer | CCCTGAAGATTGCAGGAGCA | SEQ ID NO.26 |
| MDV2-EGFP-US2-7F | Forward primer | CCACTCCCACTGTCCTTTCC | SEQ ID NO.27 |

TABLE 8-continued

List of primers and sgRNAs used in this invention study

| *Gallid alphaherpesvirus* (GaHV-3) primers and sgRNAs | Direction | Sequences (5'-> 3') | SEQ No. |
|---|---|---|---|
| MDV2-US3-7R | Reverse primer | TGTCTTCGACGTTCGTCTGG | SEQ ID NO.28 |
| gRNA1_US2/SB1_T | Upper chain | CACCGAGAAAAATCCATAAGGCCG | SEQ ID NO.29 |
| gRNA1_US2/SB1_B | Lower chain | AAACCGGCCTTATGGATTTTTCTC | SEQ ID NO.30 |
| gRNA2_US2/SB1_T | Upper chain | CACCGGAATGCCAGTCCCATCCGG | SEQ ID NO.31 |
| gRNA2_US2/SB1_B | Lower chain | AAACCCGGATGGGACTGGCATTCC | SEQ ID NO.32 |

Generation of the Recombinant rSB1-GFP-VP2

$0.5\times10^6$ CEF cells were seeded per well in a 6-well cell culture plate in maintenance medium (DMEM 1×+5% FBS) at 37° C. under 5% $CO_2$ atmosphere. After 24 hours, the supernatant was removed and the monolayer was washed 3 consecutive times with DPBS 1× to remove cell debris. Cells were infected with SB1wt with MOI of 0.01 for 8 hours at 37° C. and 5% $CO_2$ in medium DMEM 1×+5% FBS.

The next day, 1 μg of plasmid pGEM-sgA-GFP-mCMV-VP2-Poly A containing the mCMV-VP2-Poly A cassette, 0.5 μg of sgRNA-sgA, and 0.5 μg sgRNA SB1 US2, were co-transfected for 24 hours using Lipofectamine® Reagent (Thermo Fisher Scientific) following the manufacturer's instructions.

At 24 hours post-transfection, the supernatant containing the DNA complex: Lipofectamine was removed and replaced with fresh maintenance medium, to avoid any toxicity to the cell monolayer.

At three days post transfection, infected/transfected cells were transferred and distributed into 4 6-well CEF cell culture plates previously seeded.

At four days post-transfection/infection, plaques emitting GFP fluorescence were visible, corresponding to the recombinant virus. The selected clones were then purified with three rounds of plaque purification (sub-clones). For this, single cells expressing the VP2-GFP expression cassette were selected and distributed in 96-well cell culture plates by FACS on a BD FACSMelody™ Cell Sorter (BD Biosciences). Finally, the new recombinant virus was named rSB1-GFP-VP2 (SEQ ID NO. 35). Subsequently, the presence and expression of the VP2 cassette (IBDV) was verified by conventional PCR and IIF.

Selection of rSB1-GFP-VP2 Recombinant Clones

Recombinant clones of rSB1-GFP-VP2 were evaluated by conventional PCR to confirm the correct insertion of the VP2/GFP cassette into the SB1 genome post-transfection and purification. Five clones were selected and infected into previously seeded CEF cells, then trypsinized upon reaching a 70% infection rate. Viral DNA was extracted and analyzed by conventional PCR using the following specific primers, see Table 3.

Removal of the GFP Reporter Cassette by the Cre-Lox System

The GFP expression cassette (flanked by LoxP sequences) from rSB1-GFP-VP2 was removed by the Cre-Lox system. A monolayer of CEF cells was prepared in a 6-well cell culture plate and then infected with rSB1-GFP-VP2 virus with MOI of 0.01 for 24 hours. The infected monolayer was then co-transfected with 2 μg of Cre recombinase using Lipofectamine® Reagent (Thermo Fisher Scientific) following the manufacturer's instructions.

After 12 hours post-transfection the culture medium was changed to avoid any cytotoxic effect. Verification of the complete removal of the GFP reporter gene expression cassette was confirmed by the appearance of new non-fluorescent lysis plaques. Finally, the new recombinant virus obtained was named rSB1-VP2 (SEQ ID NO. 36).

Selection of Recombinant rSB1-VP2 Clones Post-Removal of the GFP Reporter Cassette Verification of the complete removal of the GFP reporter cassette in the rSB1-GFP-VP2 clones was verified by conventional PCR using specific primers (see Table 3). Likewise, these same primers allowed the integrity of the IBDV VP2 expression cassette in SB1 to be evaluated.

Indirect Immunofluorescence Assay (IIF)

CEF cells were grown in 6-well cell culture plates and infected with MOI of 0.001 with SB1wt and rSB1-VP2. After 48 hours post-infection (hpi), cells were washed three times with 1×DPBS and then fixed with 4% paraformaldehyde for 30 min at room temperature. Cells were incubated with the primary antibody in a solution of 5% bovine serum albumin (BSA) in DPBS for 1 hour at room temperature. A primary antibody: anti-serum of Infectious Bursal Disease Virus (catalog no. #G0114) (Avian Vaccine Services, LLC dba AVS Bio, Norwich, USA) was used to detect VP2 expression. After three washes with DPBS 1×, cells were incubated with a goat anti-chicken IgY secondary antibody H&L Alexa Fluor®594 at a dilution of 1:200 (catalog no. ab150172, Abcam, Cambridge, MA, USA) (red fluorescence), respectively, in 1×DPBS with 5% BSA for 1 h at room temperature. Results were observed using an ObserverA1 fluorescence microscope (Carl Zeiss, Germany). Digital images were taken at 200× magnification and processed with an AxioCam MRc5 camera (Carl Zeiss, Germany).

Western Blotting for Detection of VP2 Protein in rSB1-VP2

To assess VP2 protein expression, CEF cells were infected with the recombinant virus with MOI of 0.01. At 72 hpi, CEF cells were lysed and analyzed by Western blotting. Western blot analysis was performed using an Anti-IBDV primary antibody, VP2 Mouse (Catalog No. MBS312798, MyBioSource) diluted 2/5000 in 1% milk in 0.1% PBS-T for 15 hours at room temperature with constant agitation. Subsequently, three washes were performed with 0.1% T-TBS (each wash for 10 min with constant agitation). After finishing the washes, the membrane was incubated with the secondary antibody Anti-Mouse IgG [HRP](Catalog No.

A00160, GenScript, Piscataway, NJ, USA) diluted 2/5000 in 1% milk in 0.1% PBS-T for 2 hours at room temperature with constant agitation.

Visualizations of protein expression were detected using a photodocumenter and an AZURE CCD camera (Azure Biosystems, Inc., Dublin, USA).

Experimental Design No. 1: Immunization of Broilers with the rSB1-VP2 Vaccine

For the immunization experiment, three sub-clones of recombinant virus obtained from rSB1-VP2 clones were evaluated: 3.2, 3.7 and 18.7; a non-immunized control group was used as a control.

| Age | Group A | Group B | Group C | Group D |
|---|---|---|---|---|
| 1 day | rSB1-VP2 C 3.2 n = 12 | rSB1-VP2 C3.7 n = 12 | rSB1-VP2 C18.7 n = 12 | Non-immunized control n = 12 |

Chicks were immunized with a dose of 3000 PFU/bird, at 20, 34, and 42 days post-immunization, serum samples were collected to evaluate the humoral immune response by detecting antibodies against the IBDV VP2 protein, using an indirect ELISA IDScreen® IBD VP2 Indirect (ID. Vet Cat. No IBDVP2).

Study assessment schedule:

| | Group | | | |
|---|---|---|---|---|
| | A | B | C | D |
| | No. of birds (n) | | | |
| | 12 | 12 | 12 | 12 |
| Days | Treatment | | | Control |
| 1 | Subcutaneous immunization with 3000 PFU/Chick | | | Not applicable |
| 20 | Serological evaluation by indirect ELISA IDScreen ® IBD VP2 Indirect | | | |
| 34 | Serological evaluation by indirect ELISA IDScreen ® IBD VP2 Indirect | | | |
| 41 | Serological evaluation by indirect ELISA IDScreen ® IBD VP2 Indirect | | | |
| 42 | Challenge: 30 μl ($10^4$ $DIE_{50}$) of a classical strain F52/70 via ocular | | | |
| 45 | Evaluation of macroscopic and microscopic lesions post-challenge | | | |
| 48 | Evaluation of macroscopic and microscopic lesions post-challenge | | | |
| 52 | Evaluation of macroscopic and microscopic lesions post-challenge | | | |

At 35 days of age all birds were challenged with the F52/70 strain via ocular with a titer of $10^4$ $DIE_{50}$ (30 μl/dose).

Following challenge, birds were clinically examined for 10 days, recording mortality, depression, diarrhea, and any other clinical signs. Dead birds were necropsied to determine and confirm the cause of death.

Evaluation of Macroscopic and Microscopic Lesions

For the evaluation of macroscopic and microscopic lesions, 3 birds per group were sacrificed at 45, 48, and 52 days of age; in all cases the macroscopic and microscopic lesions found were recorded and photographed.

Bursal Index:

The bursal index was determined, i.e., the weight of the Bursa of Fabricius with respect to body weight, which is used to determine the presence or absence of atrophy of the Bursa of Fabricius.

The formula is:

$$\frac{\text{Bursa weight (g)} \times 1000}{\text{Body weight (g)}}$$

The obtained bursal index was classified as follows:

1.5-3.5=Normal Bursa 0.5-1.5=Bursal Atrophy

≤a 0.5=Severe Bursal Atrophy

Statistical Analysis

Results:

Construction and Recovery of the Recombinant Virus

The sgRNAs (sgRNA-sgA and sgRNA-US2) were designed, synthesized, and cloned into plasmid px459v.20, which contains the *S. pyogenes* Cas9 gene. The resulting plasmids were named px459v2.0-sgRNA-sgA and px459v2.0-sgRNA-US2.

Figure 11:
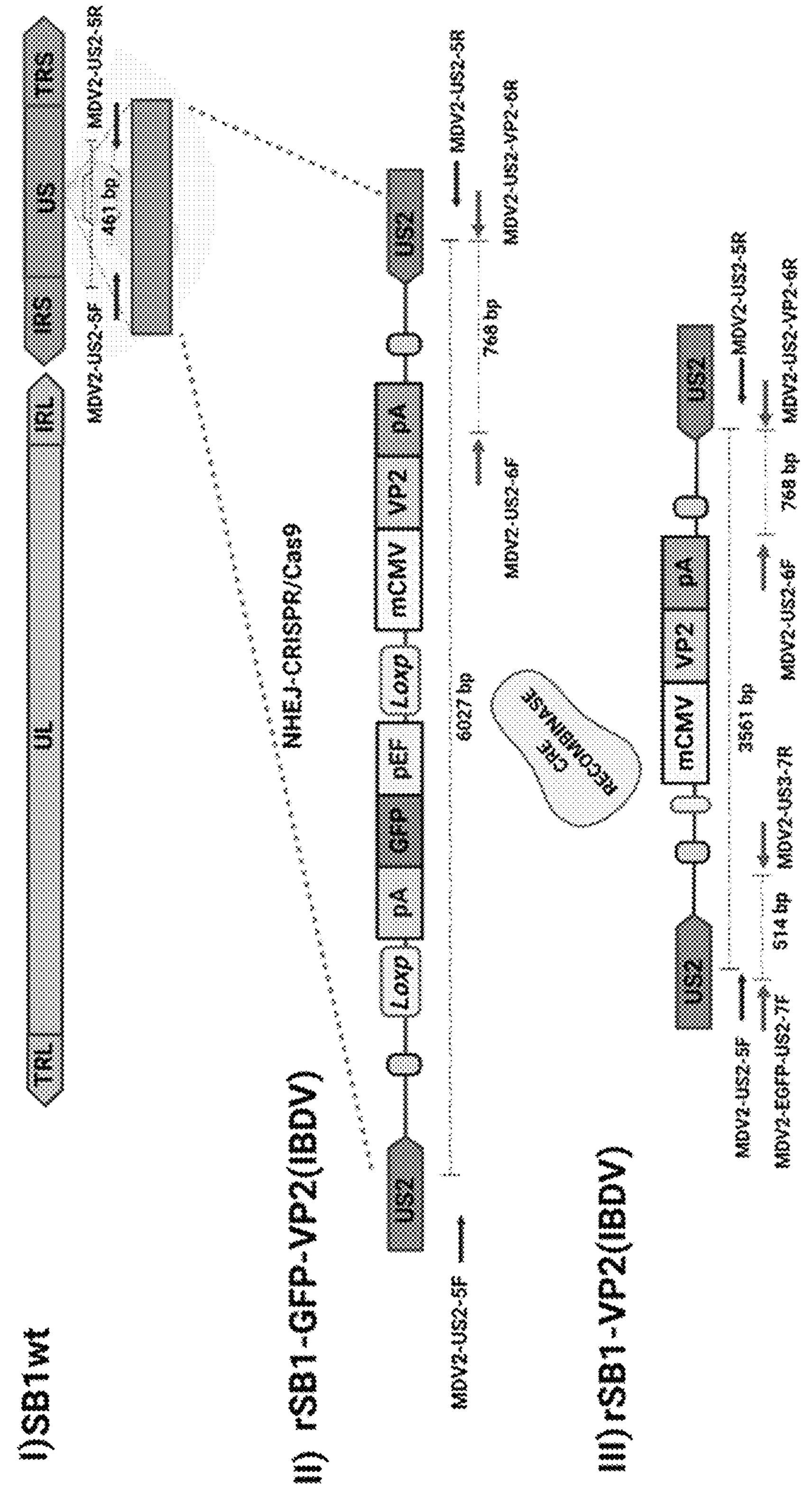
FIG. 11 shows the strategy used for the generation of the rSB1-VP2 virus by CRISPR/Cas9-NHEJ technology, using two sgRNAs from the US2 gene region (SB1 sg1/US2 and SB1 sg2/US2). The genome of the parental virus, or SB1wt, is shown with a unique long region (UL), a unique short region (US), and a long (TRL/IRL) and short (TRS/IRS) internal repeat region. Strategy used for the generation of rSB1-VP2 by CRISPR/Cas9– NHEJ. This figure was created with BioRender.com (Figure not scaled).

The donor plasmid pGEM-sgA-GFP-mMCV-VP2-Poly A contains the GFP reporter expression cassette which is flanked by two LoxP sequences for its separation from the VP2 expression cassette. The two cassettes were flanked by sg-A sites to introduce a desired cleavage for the release of the cassette and integration into the US2 intergenic region of the SB1wt genome. The Cas9 endonuclease promotes the insertion of the GFP cassette and VP2 gene into the genic region of the SB1wt genome, see FIG. 11.

For generation of rSB1-GFP-VP2 virus, CEF cells were co-transfected with plasmids pGEM-sgA-GFP-mMCV-VP2-Poly A, px459v2.0-sgRNA-sgA, px459v2.0-sgRNA1-US2, and px459v2.0-sgRNA2-US2. At 24 h post-transfection, cells were infected with SB1wt virus with MOI of 0.01. Plaques expressing GFP were visible at 4 days post-transfection/infection, demonstrating successful cassette insertion. Recombinant virus was isolated in three rounds of purification by plaque isolation and Cell Sorter.

Figure 12:
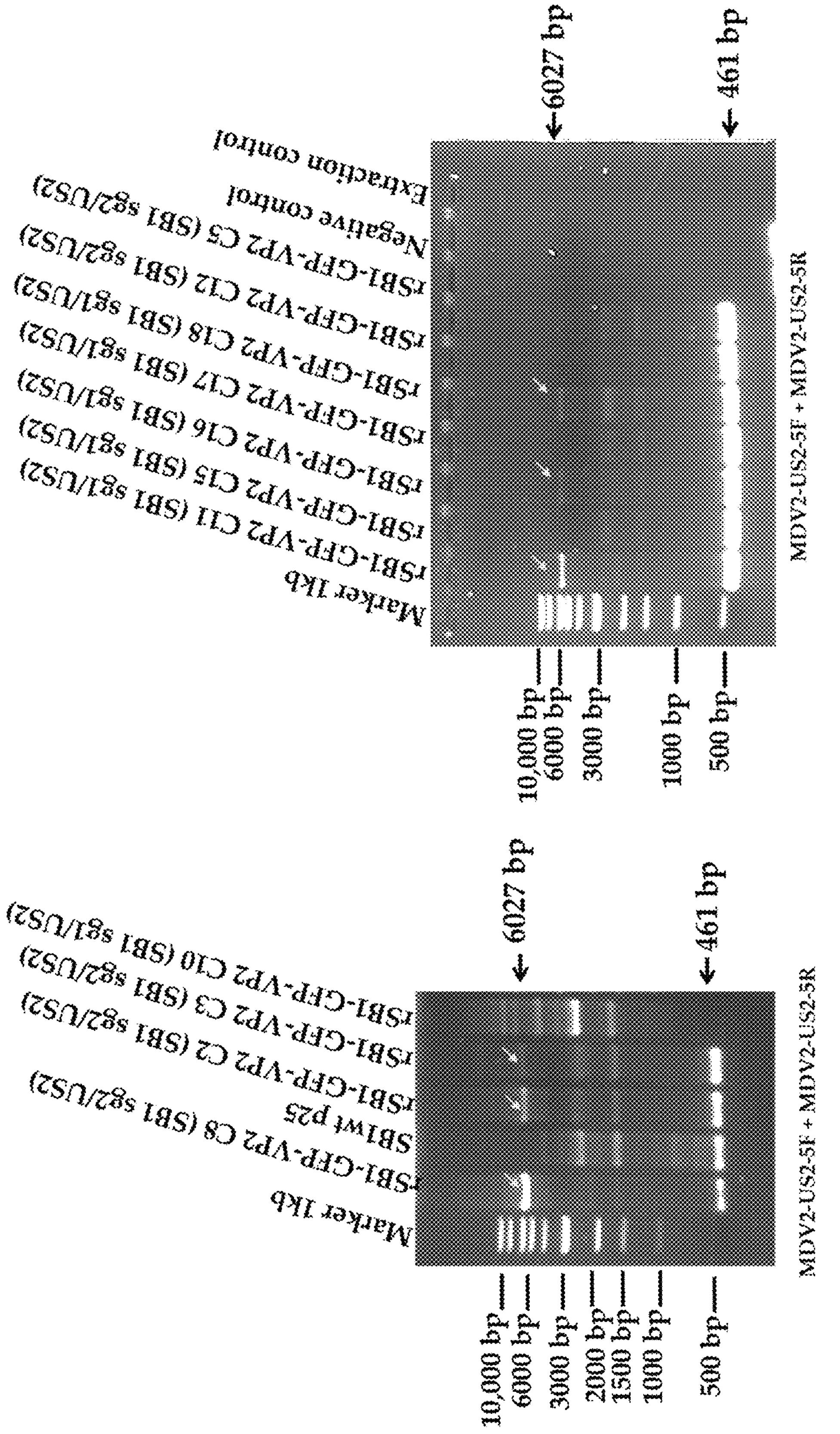
FIG. 12 shows the evaluation and selection of recombinant clones by conventional PCR of rSB1-GFP-VP2 obtained from the transfection. Recombinant clones: C10, C11, C15, C16, C17, and C18 (corresponding SB1 sg1/US2), clones C2, C3, C5, C8, and C12 (corresponding SB1 sg2/US2), were evaluated by PCR with specific primers MDV2-US2-5F+MDV2-US2-5R that amplify the flanking region of the reporter cassette, the product amplified an expected band of 6027 bp.
Figure 13:
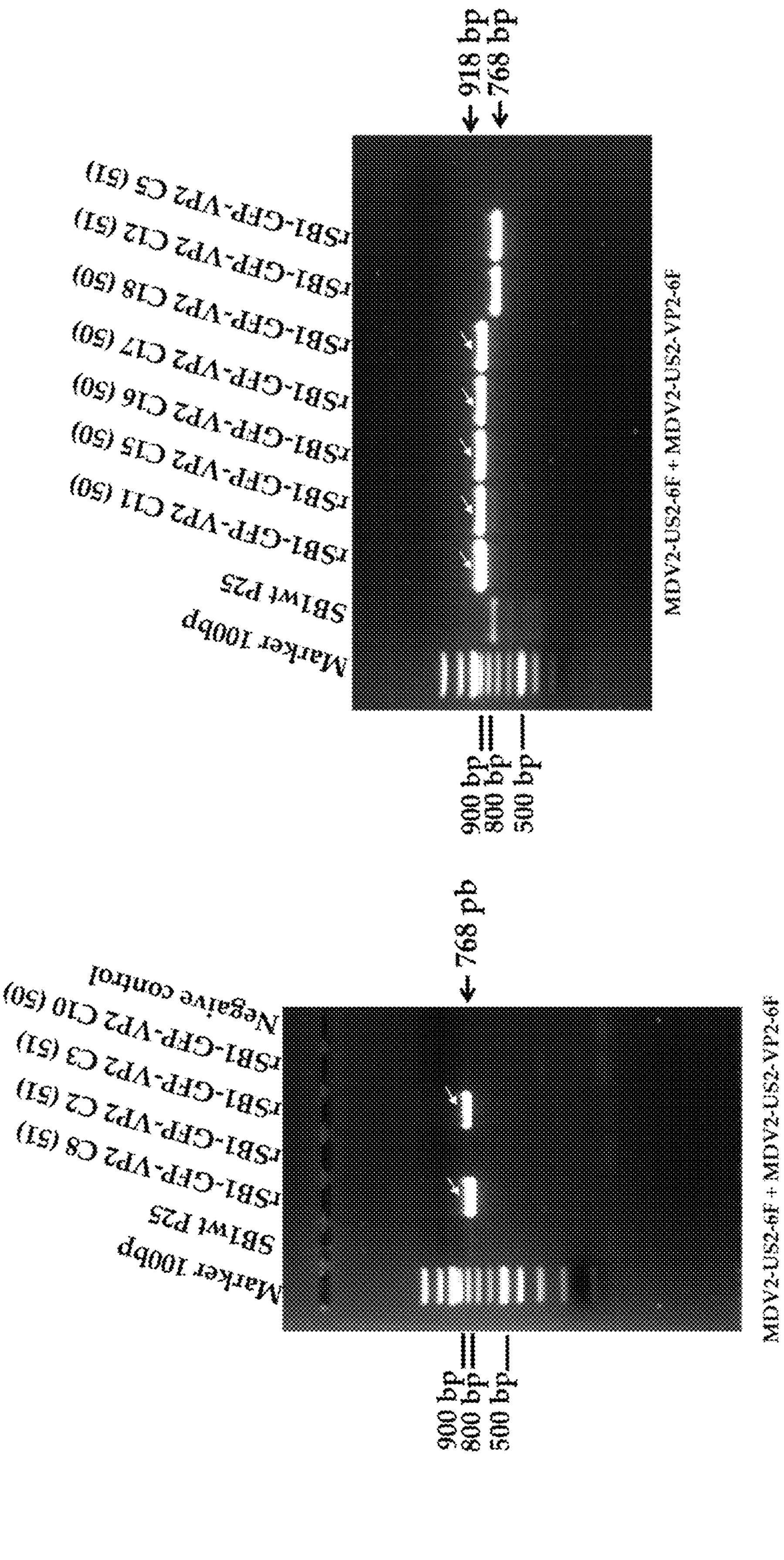
FIG. 13 shows the evaluation and selection of recombinant clones by conventional PCR of rSB1-GFP-VP2 obtained. Recombinant clones: C10, C11, C15, C16, C17, and C18 (corresponding SB1 sg1/US2 (50)), clones C2, C3, C5, C8, and C12 (corresponding SB1 sg2/US2 (51)), were evaluated by PCR with specific primers MDV2-US2-6F+MDV2-US2-VP2-6R that amplify the junction region between the expression cassette and the vector genome, the amplified products showed a band size of 918 and 768 bp respectively.
Figure 14:
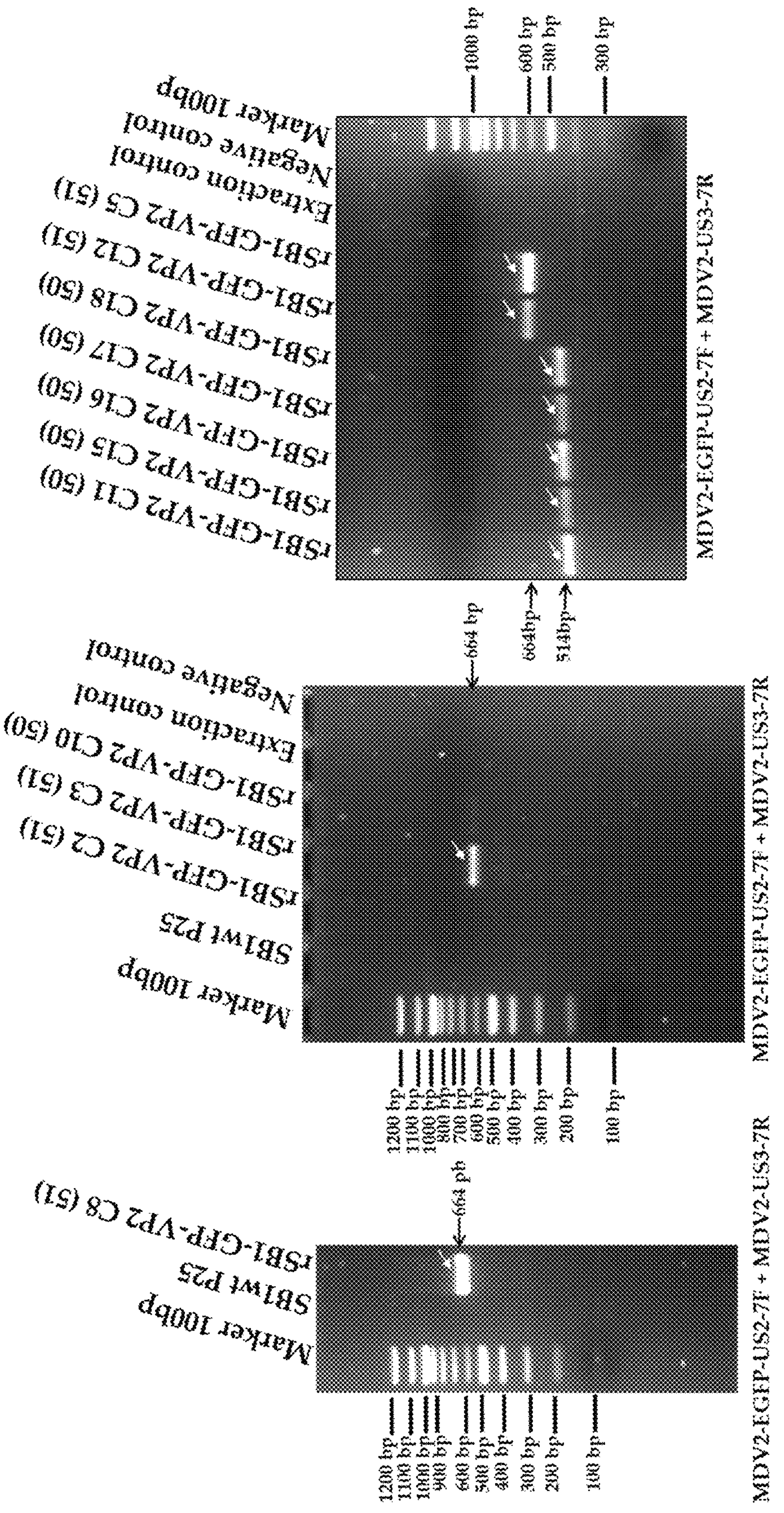
FIG. 14 shows the evaluation and selection of recombinant clones by conventional PCR of rSB1-GFP-VP2 obtained. Recombinant clones: C10, C11, C15, C16, C17, and C18 (corresponding SB1 sg1/US2 (50)), clones C2, C3, C5, C8, and C12 (corresponding SB1 sg2/US2 (51)), were evaluated by PCR with specific primers MDV2-EGFP-US2-7F+MDV2-US3-7R that amplify the joining region between the expression cassette and the vector genome, the amplified products showed a band with a size of 514 and 664 bp respectively.

Subsequently, the removal of the GFP reporter cassette was performed with Cre-recombinase (pcDNA3.1-Cre) treatment through Cre-LoxP system. Cells infected with rSB1-GFP-VP2 virus were transfected with Cre-recombinase, and lysis plaques without fluorescence emission were visible 4 days post-transfection/infection. Complete removal was confirmed by applying various conventional PCRs using specific primers that amplified the entire region and the insert-joining ends of the virus genome (FIGS. 12, 13, and 14). Finally, the new recombinant SB1 was named rSB1-VP2.

Selection of Clones after Removal of GFP Reporter Cassette

Prior to removal of the reporter cassette, rSB1-GFP-VP2 virus clones C3, C8, C11, C16, and C18 were selected for removal because they presented a DNA band size of 6855 bp by conventional PCR, which indicated the presence of both the GFP reporter cassette and the VP2 cassette.

After removal of the GFP reporter cassette, five recombinant clones rSB1-VP2 were selected, from which the complete removal of the GFP reporter cassette was verified, using a conventional PCR, see Table 3, demonstrating the complete removal of the reporter cassette and integrity of the VP2 cassette in the US2 gene region of the *Gallid alphaherpesvirus* 3 (SB1) genome.

Detection of VP2 Expression in rSB1-VP2

Figure 15:
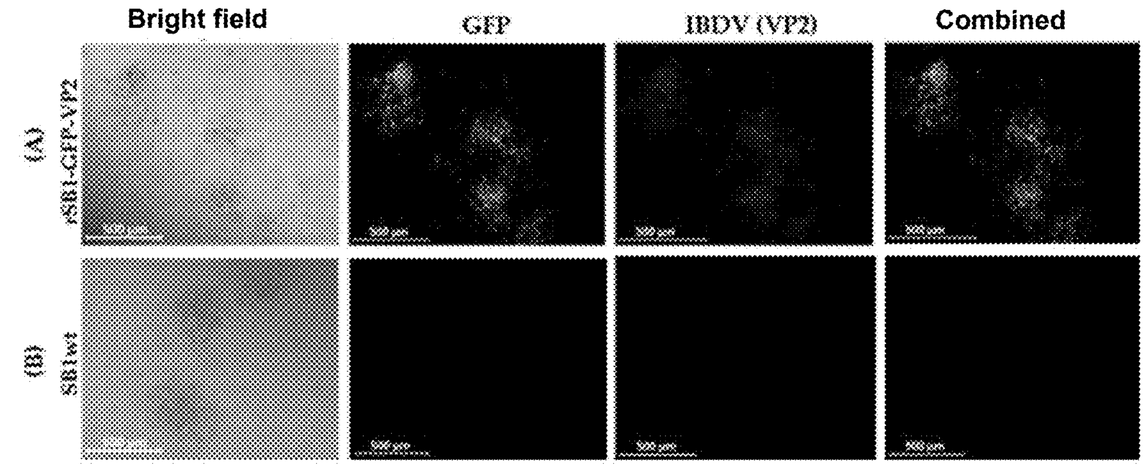
FIG. 15 shows the in vitro evaluation of the stability of the expression cassette containing the gene encoding the VP2 protein in the *Gallid alphaherpesvirus* 3 genome. CEF cells were infected with the rSB1-GFP-VP2 virus. The IIF assay demonstrated the expression of the VP2 gene (red fluorescence) in cells infected with the recombinant rSB1-GFP-VP2 virus. CEF cells infected with SB1wt were used as a negative control. Digital images were captured at 200× magnification and processed with the AxioCam MRc5 camera (Carl Zeiss, Germany).
Figure 16:
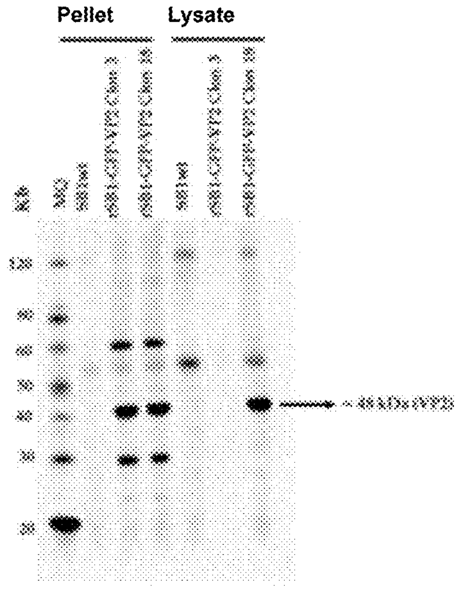
FIG. 16 shows the expression of IBDV VP2 protein in CEF cells infected with rSB1-GFP-VP2 (IBDV). Cells were infected with MOI of 0.0001 of rSB1-GFPVP2 and SB1wt. After 48 hours, cell lysates were collected and analyzed by Western blotting, detecting a band of ~48 kDa (VP2). CEF cells infected with SB1wt were used as a negative control for the experiment, in which no band was detected.

Expression of VP2 protein was confirmed by Western blotting with a 45 kDa band. CEF cells infected with SB1wt and uninfected cells were used as negative controls for the experiment, in which no band was detected (FIG. 16). IIF demonstrated expression of VP2 protein in CEF cells infected with the recombinant virus (FIG. 15). These results demonstrated that the presence and expression of the IBDV VP2 gene did not affect the replication of the recombinant virus.

Humoral Immune Response and Protection

From the third week post-immunization, antibody levels in immunized birds were measured and detected. After challenge with IBDV, all groups of birds except the non-immunized control group showed 100% protection against IBDV. Therefore, these studies demonstrate that this new recombinant *Gallid alphaherpesvirus* 3 vaccine vector induces similar antibody levels as other conventional commercial vaccines. The average clinical score and the survival percentage of birds during the IBDV challenge evaluation indicated the efficacy of the recombinant vaccine in immunized birds. The results show that GaHV-3 can be used as a vaccine vector against IBDV disease expressing the VP2 protein in one-day-old chicks, resulting in 100% protection against challenge with a lethal dose of IBDV.

Post-challenge mortality rate for both groups

| | | Days post challenge | | | | | |
|---|---|---|---|---|---|---|---|
| | Group | 1 | 2 | 3 | 4 | 5 | 6 |
| A | Dead birds | 0 | 0 | 0 | 0 | 0 | 0 |
| | % mortality | 0 | 0 | 0 | 0 | 0 | 0 |
| B | Dead birds | 0 | 0 | 0 | 0 | 0 | 0 |
| | % mortality | 0 | 0 | 0 | 0 | 0 | 0 |
| C | Dead birds | 0 | 0 | 0 | 0 | 0 | 0 |
| | % mortality | 0 | 0 | 0 | 0 | 0 | 0 |
| D | Dead birds | 0 | 0 | 2 | 3 | 3 | 4 |
| | % mortality | 0 | 0 | 16.6% | 41.6% | 66.6% | 100% |

List of Sequences:

SEQ ID NO.23 Nucleotide sequence of the primer or forward primer MDV2-US2-5F in the 5' to 3' direction Length: 21 base pairs.

SEQ ID NO.24 Nucleotide sequence of the primer or reverse primer MDV2-US2-5R in the 5' to 3' direction Length: 20 base pairs.

SEQ ID NO.25 Nucleotide sequence of the primer or forward primer MDV2-US2-6F in the 5' to 3' direction Length: 20 base pairs.

SEQ ID NO.26 Nucleotide sequence of the primer or reverse primer MDV2-VP2-6R in the 5' to 3' direction Length: 20 base pairs.

SEQ ID NO. 27 Nucleotide sequence of the primer or reverse primer MDV2-EGFP-US2-7F in the 5' to 3' direction Length: 20 base pairs.

SEQ ID NO. 28 Nucleotide sequence of the primer or reverse primer MDV2-US3-7R in the 5' to 3' direction Length: 20 base pairs.

SEQ ID NO.29 Nucleotide sequence of the upper chain oligo gRNA1_US2/SB1_T

Length: 24 bp.

SEQ ID NO.30 Nucleotide sequence of the lower chain oligo gRNA1_US2/SB1_B Length: 24 bp.

SEQ ID NO.31 Nucleotide sequence of the upper chain oligo gRNA2_US2/SB1_T

Length: 24 bp.

SEQ ID NO.32 Nucleotide sequence of the lower chain oligo gRNA2_US2/SB1_B

Length: 24 bp.

SEQ ID NO.33 Gene sequence of US2 of *Gallid alphaherpesvirus* 3 with GenBank accession number Accession number: HQ840738.1

Length: 816 bp.

SEQ ID NO.34 Nucleotide sequence of the VP2 glycoproteins of IBDV strain Faragher 52/70, with GenBank accession number: Y14958.1

Length: 1362 bp.

SEQ ID NO.35 Nucleotide sequence of the rSB1-GFP-VP2 virus (IBDV)

Length: 171,562 bp.

SEQ ID NO.36 Nucleotide sequence of rSB1-VP2 virus (IBDV)

Length: 169,094 bp.

REFERENCES

1. Jarosinski K W, Tischer B K, Trapp S, Osterrieder N. 2006. Marek's disease virus: Lytic replication, oncogenesis and control. Expert Review of Vaccines 5:761-772.
2. Petherbridge L, Xu H, Zhao Y, Smith L P, Simpson J, Baigent S, Nair V. 2009. Cloning of *Gallid herpesvirus* 3 (Marek's disease virus serotype-2) genome as infectious bacterial artificial chromosomes for analysis of viral gene functions. Journal of Virological Methods 158:11-17.
3. Kim T, Spatz S J, Dunn J R. 2020. Vaccinal efficacy of molecularly cloned *Gallid alphaherpesvirus* 3 strain 301B/1 against very virulent Marek's disease virus challenge. Journal of General Virology 101:542-552.
4. Iqbal M. 2012. Progress toward the development of polyvalent vaccination strategies against multiple viral infections in Chickens using herpesvirus of turkeys as vector. Bioengineered 3:222-226.
5. Romanutti C, Keller L, Zanetti F A. 2020. Current status of virus-vectored vaccines against pathogens that affect poultry. Vaccine 38:6990-7001.
6. Sadigh Y, Powers C, Spiro S, Pedrera M, Broadbent A, Nair V. 2018. *Gallid herpesvirus* 3 SB-1 strain as a recombinant viral vector for poultry vaccination. npj Vaccines 3:1-7.
7. Calderón K, Rojas-Neyra A, Carbajal-Lévano B, Luján-Valenzuela L, Ticona J, Isasi-Rivas G, Montalvan A, Criollo-Orozco M, Huaccachi-Gonzáles E, TatajeLavanda L, Alvarez K L F, Fernendez-Sánchez M, Fernández-Diaz M, Tang N, Yao Y, Nair V. 2022. A Recombinant Turkey Herpesvirus Expressing the F Protein of Newcastle Disease Virus Genotype XII Generated by NHEJ-CRISPR/Cas9 and Cre-LoxP Systems Confers Protection against Genotype XII Challenge in Chickens. Viruses 2022, Vol 14, Page 793 14:793.

8. Baron M D, Iqbal M, Nair V. 2018. Recent advances in viral vectors in veterinary vaccinology. Current Opinion in Virology 29:1-7.
9. Hein R, Koopman R, Garcia M, Armour N, Dunn J R, Barbosa T, Martinez A. 2021. Review of Poultry Recombinant Vector Vaccines. Avian Diseases 65:438-452.
10. Salsman J, Dellaire G. 2017. Precision genome editing in the CRISPR era. Biochemistry and Cell Biology https://doi.org/10.1139/bcb-2019-0137.
11. Suenaga T, Kohyama M, Hirayasu K, Arase H. 2014. Engineering large viral DNA genomes using the CRISPR-Cas9 system. Microbiology and Immunology https://doi.org/10.1111/1348-0421.12180.
12. Ran F A, Hsu P D, Wright J, Agarwala V, Scott D A, Zhang F. 2013. Genome engineering using the CRISPR-Cas9 system. Nature Protocols 8:2281-2308.
13. Chumbe A, Izquierdo-Lara R, Tataje-Lavanda L, Figueroa A, Segovia K, Gonzalez R, Cribillero G, Montalvan A, Fernández-Diaz M, Icochea E. 2015. Characterization and Sequencing of a Genotype XII Newcastle Disease Virus Isolated from a Peacock (*Pavo cristatus*) in Peru. Genome Announcements 3:e00792-15.

SEQUENCE LISTING

The patent contains a lengthy sequence listing. A copy of the sequence listing is available in electronic form from the USPTO web site (https://seqdata.uspto.gov/docdetail?docId=US12473572B1). An electronic copy of the sequence listing will also be available from the USPTO upon request and payment of the fee set forth in 37 CFR 1.19(b)(3).

What is claimed is:

1. A recombinant *Gallid alphaherpesvirus* 3 (GaHV-3; MDV-2) virus that expresses a heterologous polynucleotide encoding and expressing a gene or antigen from an avian pathogen, inserted into the UL45/UL46 intergenic region and the US2 gene regions of *Gallid alphaherpesvirus* 3 (GaHV-3; MDV-2).

2. The recombinant virus of *Gallid alphaherpesvirus* 3 (GaHV-3; MDV-2) according to claim 1, further characterized in that the *Gallid alphaherpesvirus* 3 (GaHV-3; MDV-2) is selected from the non-oncogenic strains: SB-1, 301B/1, and HPRS-24.

3. The recombinant *Gallid alphaherpesvirus* 3 (GaHV-3; MDV-2) virus according to claim 1, characterized in that the heterologous polynucleotide sequences that can be inserted into the *Gallid alphaherpesvirus* 3 (GaHV-3; MDV-2) genome are: (i) fusion gene (F) (SEQ. ID. NO. 3) of Newcastle disease virus (NDV) genotype XII, or at least another hemagglutinin neuraminidase (HN) gene, (ii) glycoproteins D and I (gD-I) (SEQ. ID. NO. 20) of avian infectious laryngotracheitis (ILTV) or at least one gene of the following genes gB, gE, and gC, (iii) the VP2 protein (SEQ. ID. NO. 34) of Gumboro infectious disease (IBDV) or at least one gene of the following genes VP3, VP4 of IBDV, (iv) the hemagglutinin (HA) and neuraminidase (NA) genes of H5N1, H5N9, avian influenza (AIV), avian infectious bronchitis (IBV) at least one Spike (S) gene, S1, and S2.

4. The recombinant virus of *Gallid alphaherpesvirus* 3 (GaHV-3; MDV-2), expressing the fusion gene (F) of NDV genotype XII, the glycoproteins D and I of ILT, according to claim 1, characterized in that the insertion of the NDV F gene and glycoproteins D and I of ILT, is inserted into the non-coding intergenic region between UL45/46 of the genome of *Gallid alphaherpesvirus* 3, which has SEQ ID NO. 2.

5. The recombinant virus of *Gallid alphaherpesvirus* 3 (GaHV-3; MDV-2), which expresses the gene of the IBDV VP2 protein, according to claim 1, characterized in that the insertion of the IBDV VP2 gene is inserted into the non-essential US2 gene region for the genome of *Gallid alphaherpesvirus* 3 (GaHV-3; MDV-2), which has SEQ ID NO. 33.

6. The recombinant *Gallid alphaherpesvirus* 3 virus (GaHV-3; MDV-2) expressing the fusion gene (F) of the Newcastle disease virus (NDV) genotype XII according to claim 3, characterized in that the cleavage site or polybasic cut ($^{112}$RRQKRF$^{117}$) is modified to dibasic ($^{112}$GRQGRL$^{117}$).

7. The recombinant *Gallid alphaherpesvirus* 3 (GaHV3; MDV-2) virus expressing the fusion gene (F) of Newcastle disease virus (NDV) genotype XII according to claim 1, characterized in that the synthetic sequence of the F cassette (genotype XII) is stored in the plasmid pUC57-F, the sequence of the F cassette and HN of NDV.

8. An immunogenic composition characterized in that it comprises the recombinant virus of *Gallid alphaherpesvirus* 3 (GaHV3; MDV-2), which expresses the F gene of NDV genotype XII identified with SEQ ID NO. 5 and pharmaceutically acceptable excipients.

9. An immunogenic composition characterized in that it comprises the recombinant *Gallid alphaherpesvirus* 3 virus (GaHV3; MDV-2), which expresses glycoproteins D and I of ILTV strain VFAR-043 identified with SEQ ID NO.22 and pharmaceutically acceptable excipients.

10. An immunogenic composition characterized in that it comprises the recombinant *Gallid alphaherpesvirus* 3 virus (GaHV3; MDV-2), which expresses the VP2 gene of IBDV strain Faragher 52/70, identified with SEQ ID NO.36 and pharmaceutically acceptable excipients.

11. A procedure for generating a recombinant virus of *Gallid alphaherpesvirus* 3 (GaHV3; MDV-2), expressing antigenic genes against different avian diseases NDV, ILTV, IBDV, IBV, AIV, wherein the method comprises:

a) Design and construction of gRNAs and donor plasmid;
b) Generation of recombinants;
c) Recovery of recombinant viruses;
e) Selection and characterization of recombinant viruses containing the GFP cassette+the cassette of interest (protective antigen), by conventional PCR amplifying the complete inserted cassette and the joining zones between the genome of the recombinant virus obtained and the genome of the modified virus itself,
f) Removal of the expression cassette of the fluorescent reporter gene "GFP" by the Cre-Lox system and selection of recombinant clones using conventional PCR;

g) Detection of expression of proteins of interest in cells infected with recombinant viruses by indirect immunofluorescence (IIF);

h) Determination of gene expression by Western blot (WB);

i) Evaluation of genetic stability of the cassette inserted into the virus genome by conventional PCR and/or Western blot (WB); and j) Measure in vitro growth properties.

12. A kit comprising a vaccine or immunogenic composition according to claim 3 and a medium.

13. An immunogenic composition comprising a recombinant *Gallid alphaherpesvirus* 3 (GaHV-3; MDV-2) virus according to claim 3, further characterized in that the concentration of virus required to achieve the antigenic response is 3000 plaque forming units per bird (PFU/bird).

14. A viral vector comprising a recombinant *Gallid alphaherpesvirus* 3 (GaHV-3; MDV-2) virus according to claim 3, useful in the control against Newcastle disease virus (NDV), against infectious bursal disease virus or Gumboro (IBDV), against avian infectious bronchitis virus (IBV), against avian infectious laryngotracheitis virus (ILTV) and against avian influenza virus (AIV).

15. An immunogenic composition comprising the recombinant *Gallid alphaherpesvirus* 3 (GaHV-3; MDV-2) virus according to claim 3, further characterized in that the *Gallid alphaherpesvirus* 3 (GaHV3; MDV-2), is selected from the non-oncogenic strains: SB-1, 301B/1, and HPRS-24.

* * * * *